(12) United States Patent
Lee et al.

(10) Patent No.: US 8,467,199 B2
(45) Date of Patent: Jun. 18, 2013

(54) TWO-STAGE INSULATED BIDIRECTIONAL DC/DC POWER CONVERTER USING A CONSTANT DUTY RATIO LLC RESONANT CONVERTER

(75) Inventors: Jun-Young Lee, Gyeonggi-do (KR); Yu-Seok Jeong, Seoul (KR); Hyung-Jun Chae, Gyeonggi-do (KR); Kwang-Min Yoo, Seoul (KR); Jae-Jin Chang, Seoul (KR); Jae-Ha Chang, Seoul (KR)

(73) Assignees: Myongji University Industry and Academia Cooperation Foundation, Yongin-si (KR); Orient Electronics Inc., Seongnam-si (KR)

( * ) Notice: Subject to any disclaimer, the term of this patent is extended or adjusted under 35 U.S.C. 154(b) by 333 days.

(21) Appl. No.: 12/832,656

(22) Filed: Jul. 8, 2010

(65) Prior Publication Data
US 2011/0090717 A1    Apr. 21, 2011

(30) Foreign Application Priority Data
Oct. 21, 2009    (KR) .......................... 10-2009-0100418

(51) Int. Cl.
*H02M 3/335*    (2006.01)
(52) U.S. Cl.
USPC ..................................... 363/21.02; 363/21.04
(58) Field of Classification Search
USPC ............... 363/15, 21.02, 21.04, 21.07, 21.08, 363/22, 24
See application file for complete search history.

(56) References Cited

U.S. PATENT DOCUMENTS

| 6,205,035 | B1 | 3/2001 | Vollmer et al. |
| 6,574,125 | B2 | 6/2003 | Matsukawa et al. |
| 7,742,318 | B2 * | 6/2010 | Fu et al. ........................... 363/16 |
| 2007/0070655 | A1 * | 3/2007 | Eguchi et al. ................... 363/17 |
| 2007/0242487 | A1 * | 10/2007 | Orr ............................ 363/21.12 |
| 2009/0059622 | A1 * | 3/2009 | Shimada et al. ................ 363/17 |

FOREIGN PATENT DOCUMENTS

KR    10-0790709    12/2007

OTHER PUBLICATIONS

Kim, In-Ju, "Development of Bi-directional DC/DC Converter for the 42V Vehicle Energy management System", Department of Electrical Engineering and Computer Science, Korea Advanced Institute of Science and Technology, Jul. 12, 2004, (English Abstract).

* cited by examiner

*Primary Examiner* — Adolf Berhane
*Assistant Examiner* — Emily Pham
(74) *Attorney, Agent, or Firm* — Brian R. Morrison; Westman, Champlin & Kelly, P.A.

(57) ABSTRACT

A two-stage insulated bidirectional DC/DC power converter is disclosed. A two-stage insulated bidirectional DC/DC power converter according to an embodiment of the invention has the characteristic of including: an LLC resonant converter operating at a constant duty ratio; a bidirectional converter joined to a front part of the LLC resonant converter and configured to perform a booster converter function of outputting the input voltage at a consistent input voltage for the LLC resonant converter, and a buck converter function of reducing the voltage by way of the LLC resonant converter and then outputting a consistent voltage; and a bidirectional converter control unit configured to control changes in an input voltage of the bidirectional converter and regulate an output voltage of the LLC resonant converter to thereby maintain a consistent input voltage of the LLC resonant converter, such that the LLC resonant converter operates at a constant duty ratio.

17 Claims, 19 Drawing Sheets

TWO-STAGE INSULATED BIDIRECTIONAL DC/DC POWER CONVERTER USING A CONSTANT DUTY RATIO LLC RESONANT CONVERTER

BACKGROUND

1. Technical Field

The present invention relates to a DC/DC power converter. More specifically, the invention relates to a highly efficient DC/DC power converter that can be driven in both directions.

2. Description of the Related Art

In general, the topology used for a bidirectional DC-DC power converter comes in two types: full-bridge converter and current-fed converter. Such converters have the disadvantage of the control integrated circuit (henceforth referred to as IC) being comparatively expensive, and the switching device, namely, metal-oxide semiconductor field effect transistor, (henceforth referred to as MOSFET) having a high level of voltage and current stress, and therefore decreasing the efficiency of the system.

FIG. 2 is a circuit diagram of a bidirectional DC-DC power converter using the full-bridge topology. The operation in forward direction comprises: a DC/DC converter unit 20; a control unit 22 configured to send the gate waveform to each switch and to control the gate waveform so as to maintain the power output; an output side L-C filter unit 24; and lastly, an output voltage detector circuit 26. The DC/DC converter unit 20 comprises: 4 MOSFETs ($S_{p1}$, $S_{p2}$, $S_{p3}$, $S_{p4}$); a step-up transformer; and another 4 MOSFETs ($S_{s1}$, $S_{s2}$, $S_{s3}$, $S_{s4}$) configured to act as rectifier switches and to compare the voltage detected at the output voltage detector circuit 26 with the standard voltage at the control unit 22, adjusting the gate width of the MOSFETs and maintaining the output voltage at a consistent level.

The control unit transmits energy to the step-up transformer by switching on or off in turns the first switches on the first switching device transformer ($S_{p1}$, $S_{p4}$) and the first switches on the second transformer ($S_{s1}$, $S_{s4}$), or the second switches on the first transformer ($S_{p2}$, $S_{p3}$) and the second switches on the second transformer ($S_{s2}$, $S_{s3}$). The stepped-up energy goes through the rectifier switches ($S_{s1}$, $S_{s4}$, $S_{s2}$, $S_{s3}$) and converts to direct current (DC), finally outputting through the LC filter 203 consisting of a coil (L) and a capacitor (C).

The conventional full-bridge converter has the problem of the control IC being comparatively expensive, due to having to output four gate waveforms, and the problem that, the larger the capacity of the converter, the greater the switching loss at the four points, and therefore, efficiency vastly decreases.

SUMMARY

A purpose of the present invention is to provide a highly efficient and simply regulated two-stage bidirectional DC/DC power converter. More specifically, it is to provide a DC/DC power converter that can be driven in both directions by including a controlled bidirectional converter, which has a switching device, instead of a diode, on the input and output sides of a bidirectional DC/DC power converter, to simultaneously perform booster and buck functions; and an unregulated LLC resonant converter, which only provides a fixed booster ratio function (fixed buck ratio function when operated in the reverse direction) according to the insulation between input and output as well as the turn ratio of the transformer.

In order to accomplish the aforementioned purpose, an aspect of the present invention provides a high-efficiency bidirectional DC/DC power converter, using an unregulated LLC converter outputting the input voltage at a consistent voltage, and an unregulated bus converter having the characteristic of including a controlled DC/DC converter connected to the unregulated LLC converter.

This two-stage insulated bidirectional DC/DC power converter according to an embodiment of the invention has the characteristic of including: an LLC resonant converter operating at a constant duty ratio; a bidirectional converter joined to a front part of the LLC resonant converter and configured to perform a booster converter function of outputting the input voltage at a consistent input voltage for the LLC resonant converter, and a buck converter function of reducing the voltage by way of the LLC resonant converter and then outputting a consistent voltage; and a bidirectional converter control unit configured to control changes in an input voltage of the bidirectional converter and regulate an output voltage of the LLC resonant converter to thereby maintain a consistent input voltage of the LLC resonant converter, such that the LLC resonant converter operates at a constant duty ratio.

Here, the bidirectional converter control unit has the characteristic, when operation is in the forward direction, of receiving feedback from the output of the LLC resonant converter and controlling the output of the booster converter, and when operation is in the reverse direction, receiving feedback from the output of the buck converter and controlling the external output. At the same time, the LLC resonant converter receives as input the output from the booster converter, and outputs it externally.

Also, it includes an output voltage detector circuit that, when operated in the forward direction, detects the output voltage of the LLC resonant converter and feeds it back into the control unit of the bidirectional converter, or, when operated in the reverse direction, detects the output voltage of the bidirectional converter and feeds it back into the control unit of the aforementioned bidirectional converter. The control unit of the bidirectional converter has the characteristic of adjusting the output voltage of the bidirectional converter according to the output voltage of the LLC resonant converter during forward operation or of the bidirectional converter during reverse operation, fed back from the output voltage detector circuit. A constant duty ratio gate pulse generating circuit controlling the on/off of the LLC resonant converter is included, and the bidirectional converter control unit and the constant duty ratio gate pulse generating circuit include a pulse width modulation controller.

Furthermore, the bidirectional converter can be connected additionally in parallel according to the capacity of the converter.

At the same, the method for controlling the on/off state of the LLC resonant converter is half-bridge or full-bridge, while the second transformer includes a full-bridge or push-pull rectifier circuit. Furthermore, switching of the full-bridge or push-pull rectifier circuit is done by the constant duty ratio gate pulse generating circuit.

At the same time, with regards to the present invention, the two-stage insulated bidirectional DC/DC power converter using a constant duty ratio LLC resonant converter, the LLC resonant converter comprises: first and second resonant switches in series connection; a resonant capacitor in parallel connection with the aforementioned second resonant switch; a resonant inductor and a primary coil in series connection with the resonant capacitor; a secondary coil positioned opposite the aforementioned primary coil; first to fourth switches joined to the secondary coil; and a capacitor in parallel connection with the second and fourth switches.

Also, in an alternative fashion, as regards the present invention, the two-stage insulated bidirectional DC/DC power converter using a constant duty ratio LLC resonant converter, the aforementioned LLC resonant converter comprises: first and second resonant switches in series connection; a resonant capacitor in parallel connection with the aforementioned second resonant switch; a resonant inductor and a primary coil in series connection with the aforementioned resonant capacitor; secondary coils positioned opposite the primary coil; first and second switches each joined to the secondary coils and operating the secondary coils differently from each other; and a capacitor joined to the output unit. At the same time, as regards the method in which the secondary coils and the first and second switches on the output side operate differently from each other, the LLC resonant converter, when in reverse operation, can be expressed as comprising: a capacitor in parallel connection; first and second switches, each joined to the primary coils (corresponding to secondary coils when operated in the forward direction) and configured to make the primary coils operate differently from each other and to convert direct current to alternating current; secondary coils (corresponding to primary coils when operated in the forward direction) positioned opposite the aforementioned plural primary coils; first and second resonant switches in charge of rectification and resonant; and a resonant capacitor in parallel connection with the second resonant switch.

The two-stage insulated bidirectional DC/DC power converter using a constant duty ratio LLC resonant converter according to an embodiment of the invention, as it is designed as a two-stage structure, reduces stress, and by implementing a bidirectional DC/DC power converter, achieves a higher level of efficiency and reduces the costs of the control IC and switching device in comparison with the existing DC/DC power converter.

Also, in forward operation, it can convert low voltage high current input into high voltage low current output, and in reverse operation, convert high voltage low current input into low voltage high current output.

Also, even with a wide range of changes and loads, it makes stable energy transfer possible, and compensates for the disadvantages that existing converters have of the complexity in output control and of the reduction in efficiency due to the loss through the switching device.

Additional aspects and advantages of the present invention will be set forth in part in the description which follows, and in part will be obvious from the description, or may be learned by practice of the invention.

DETAILED DESCRIPTION

Figure 1A:
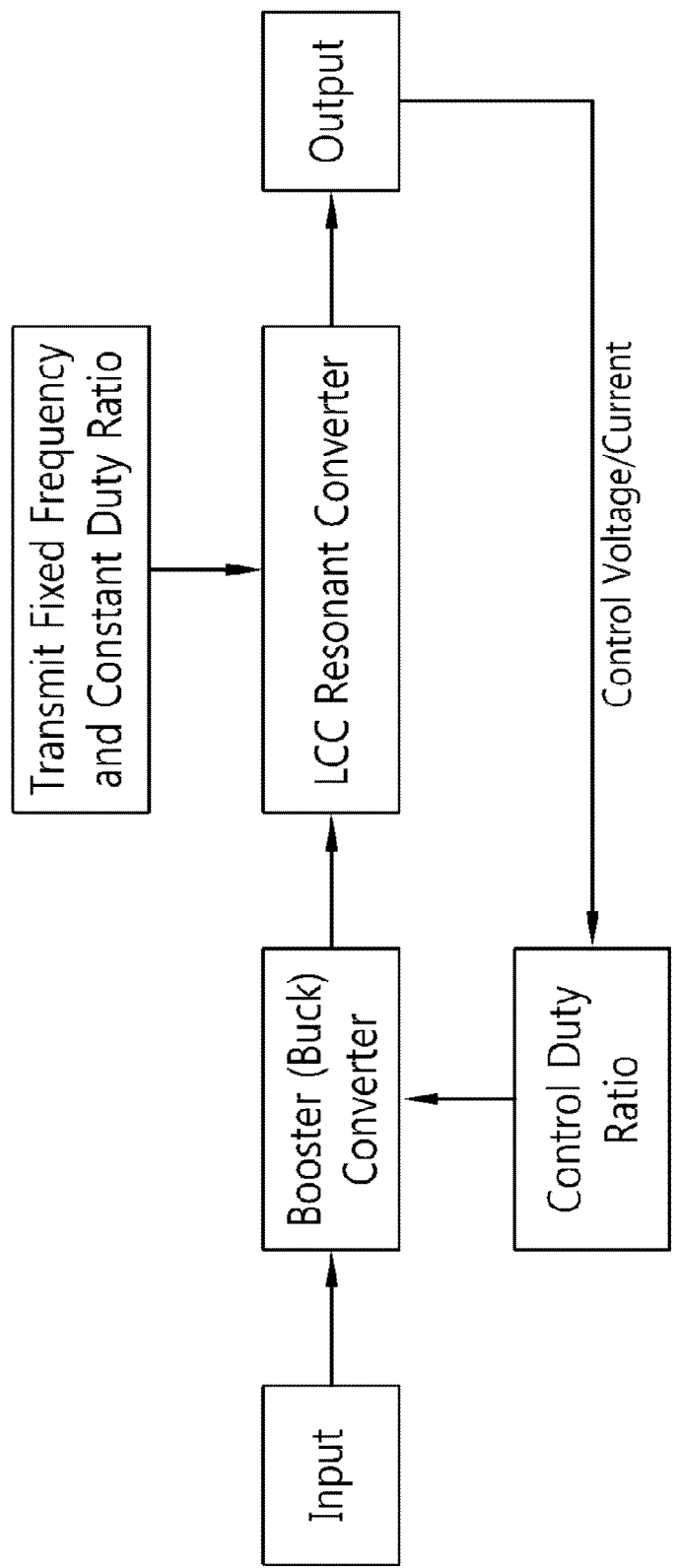
FIGS. 1(a) and 1(b) are block diagrams of the high-efficiency bidirectional DC/DC power converter using an unregulated bus converter according to an embodiment of the invention.

A detailed description will now be provided on the present invention with reference to the accompanying drawings. The reference numerals indicated on each illustration maintain consistency, and therefore, those elements indicated by the same numerals in different illustrations should be interpreted as having the same configuration and effect.

Figure 1B:
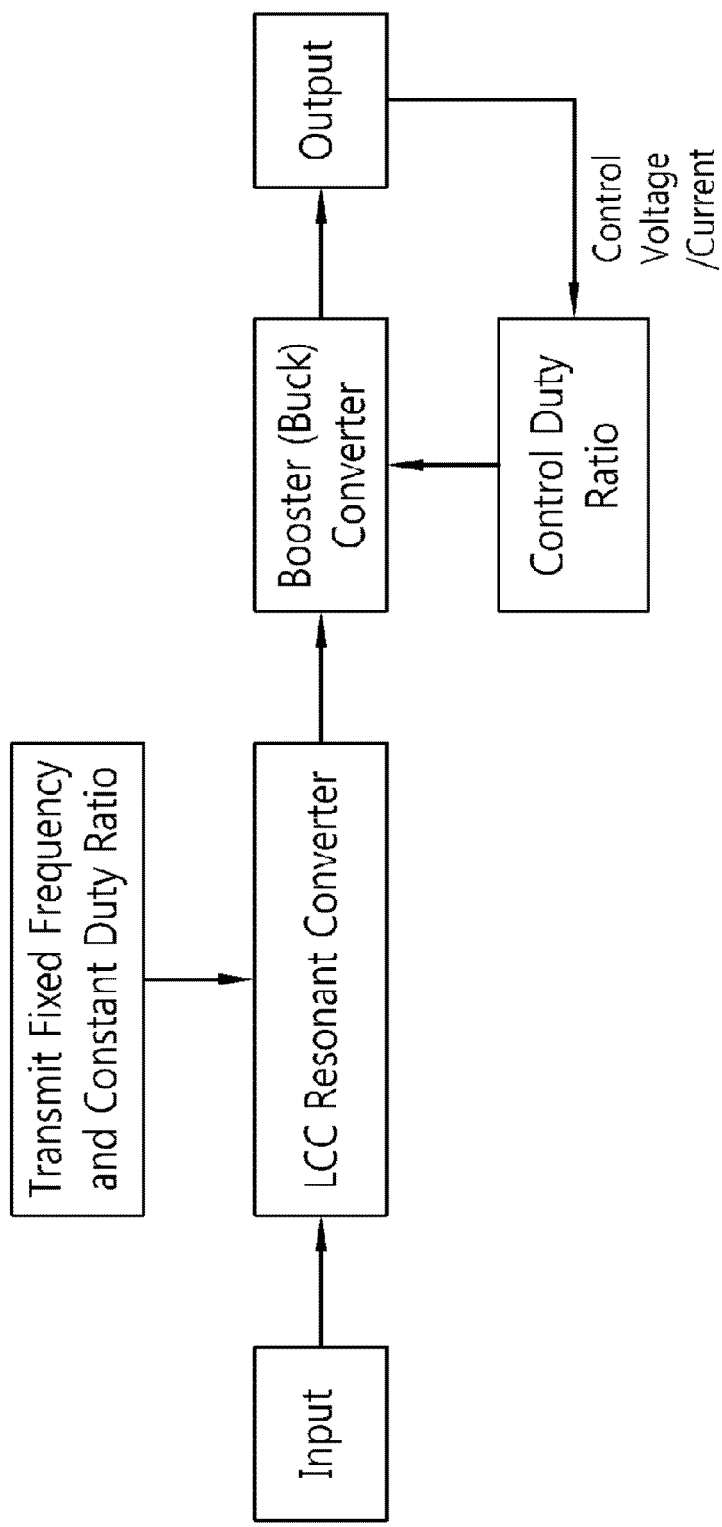

FIGS. 1(a) and 1(b) are block diagrams of the high-efficiency bidirectional DC/DC power converter using an unregulated bus converter according to an embodiment of the invention.

In more detail, FIG. 1(a) is a block diagram of the forward operation, and FIG. 1(b) is a block diagram of the reverse operation. In FIG. 1(a), the boost converter receiving input outputs the input of the LLC resonant converter; the aforementioned LLC resonant converter is switched on/off by signals of fixed frequency and constant duty ratio, and outputs externally. At the same time, it detects the output of the aforementioned LLC resonant converter, receives feedback from it, and through duty ratio control, controls in turn the external output of the aforementioned boost converter. At the same time, in FIG. 1(b), the LLC resonant converter receiving input is switched on/off by signals of fixed frequency and constant duty ratio and outputs the input for the buck converter, and the aforementioned buck converter is controlled by the duty ratio to output externally. At this time, the external output is fed back and again controlled by the duty ratio into controlling the output of the buck converter.

Figure 2:
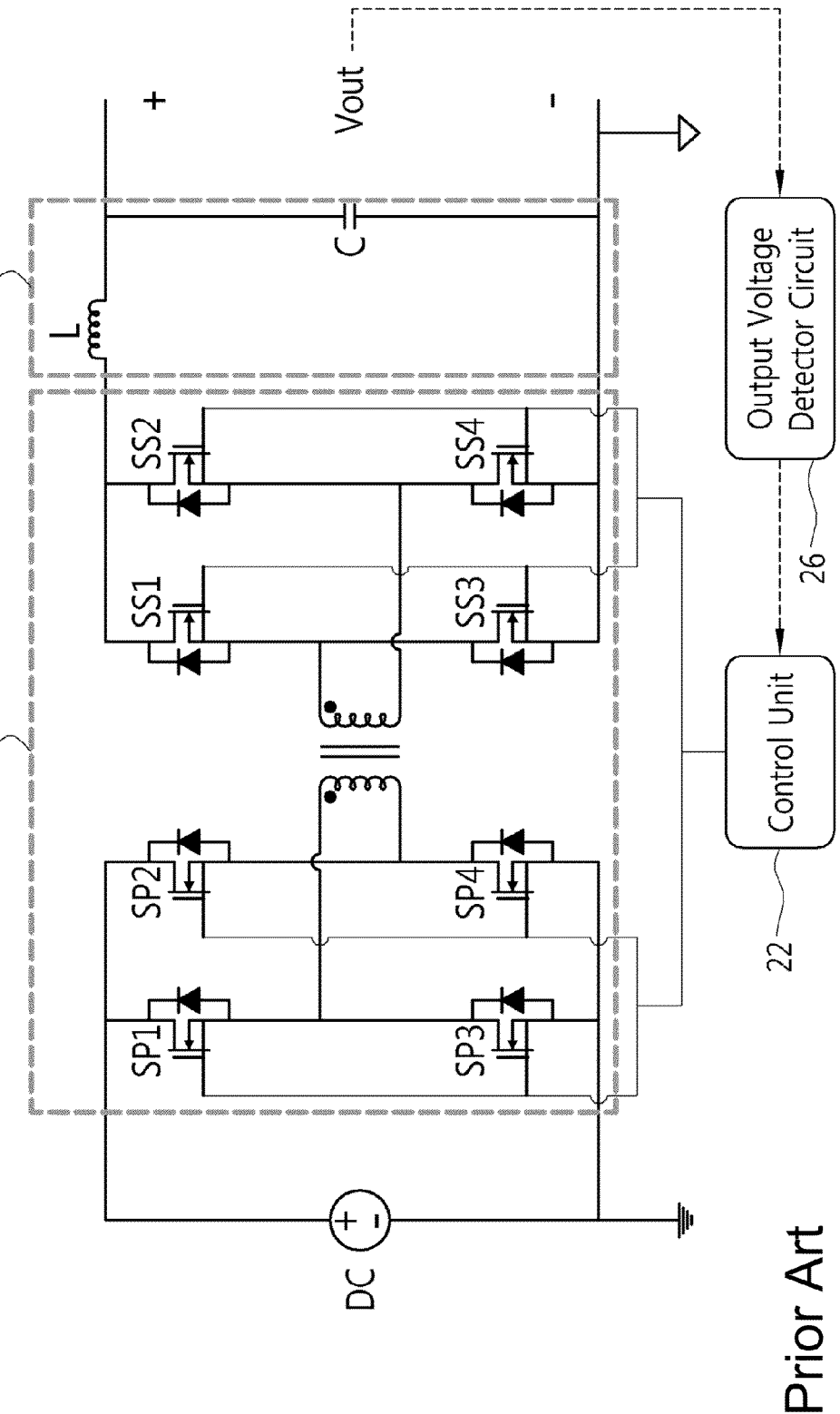
FIG. 2 is a circuit diagram of the bidirectional DC/DC power converter using the conventional full-bridge topology.

FIG. 2 is a circuit diagram of the bidirectional DC/DC power converter using the conventional full-bridge topology, and as it has already been described, explanation will be omitted.

An explanation will now be provided, with reference to the illustrations, on a high-efficiency bidirectional DC/DC power converter according to an embodiment of the invention that uses an unregulated bus converter as an LLC resonant converter and operates as a boost converter when the operation is in forward direction, while operating as a buck converter when the operation is in reverse direction.

Application Example 1

Figure 3A:
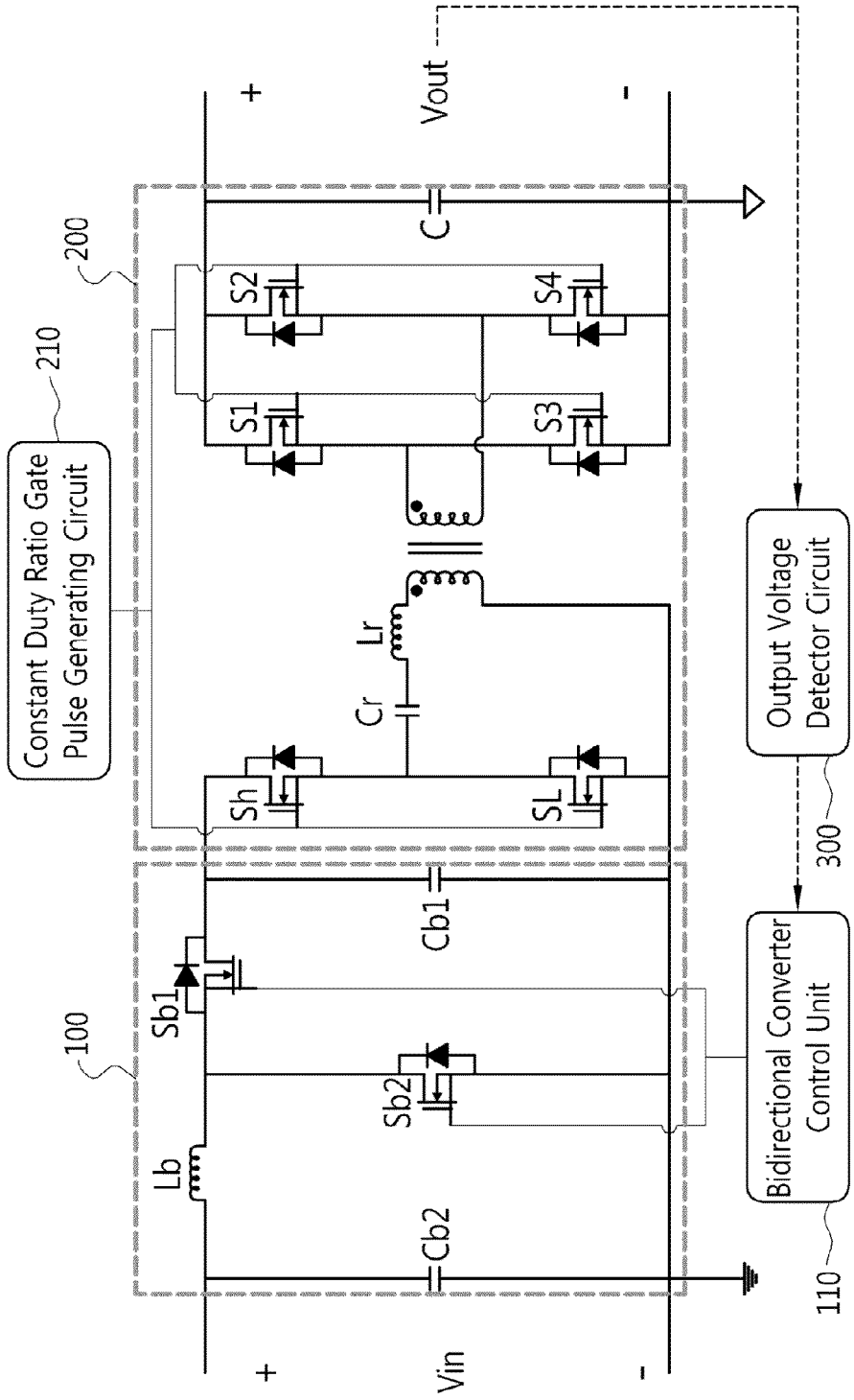
FIGS. 3(a) and 3(b) are circuit diagrams of the high-efficiency bidirectional DC/DC power converter using an unregulated bus converter according to a preferred embodiment of the present invention.
Figure 3B:
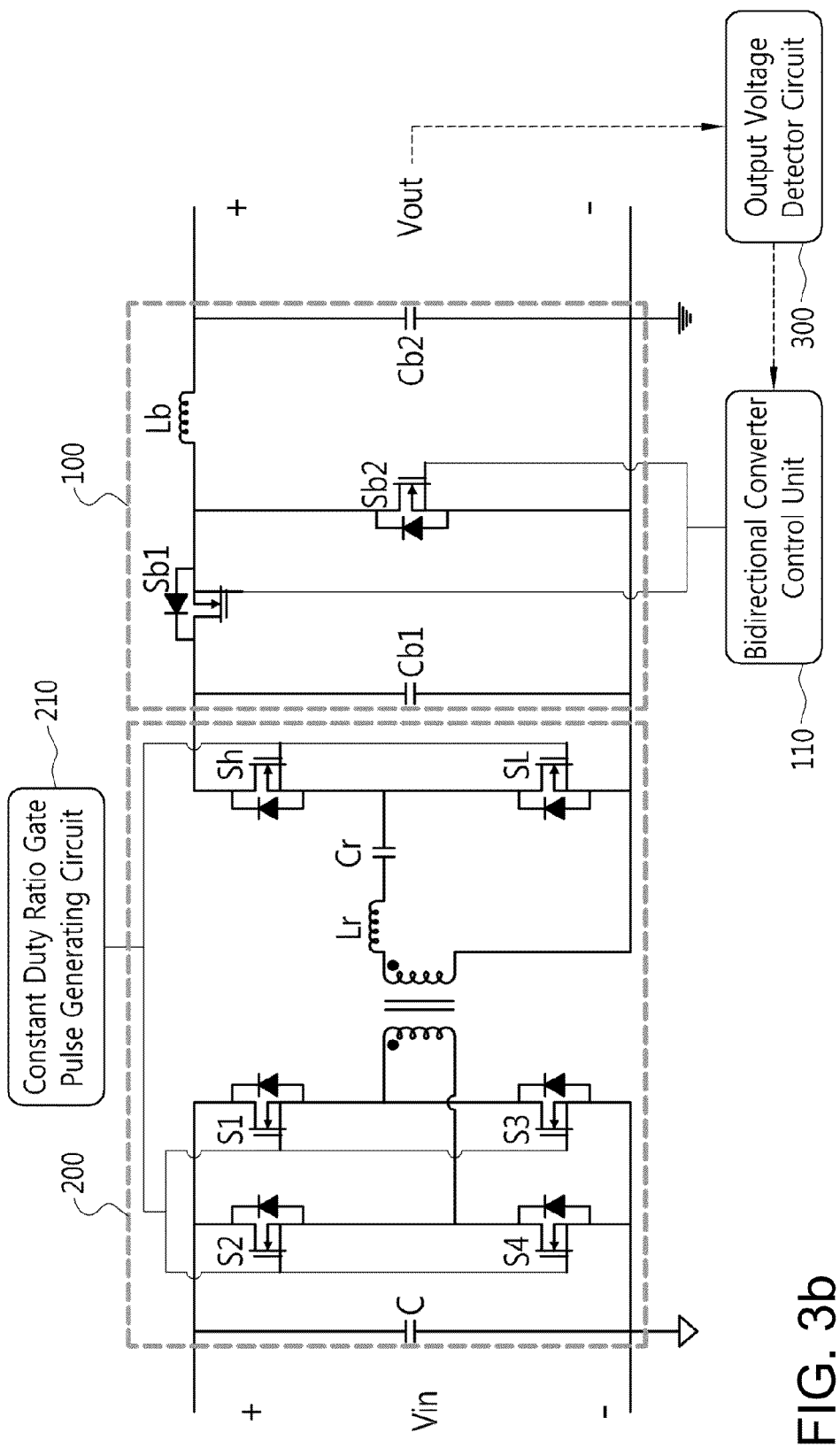

FIGS. 3(a) and 3(b) are circuit diagrams of the high-efficiency bidirectional DC/DC power converter using an unregulated bus converter according to a preferred embodiment of the present invention.

As illustrated in FIGS. 3(a) and 3(b), the high-efficiency bidirectional DC/DC power converter using an unregulated bus converter according to an embodiment of the invention comprises a controlled DC/DC converter and an unregulated bus converter.

The controlled DC/DC converter is for smoothing the external output according to an embodiment of the invention, and to this end, receives feedback from the external output.

The unregulated bus converter only provides the functions of insulation between input and output of the LLC resonant converter and of a fixed step-up rate (or fixed step-down rate in reverse operation) according to the turn ratio of the transformer, and therefore, does not require control.

More specifically, FIGS. 3(a) and 3(b) are circuit diagrams of the two-stage insulated bidirectional DC/DC power converter using an unregulated, constant duty ratio LLC resonant converter according to Application Example 1 in forward operation and in reverse operation, respectively.

A description will now be given of the operation driven in the forward direction, with reference to FIG. 3(a).

In FIG. 3(a), the unregulated LLC resonant converter 200 receives input from the output of the controlled DC/DC converter 100 and outputs it externally. At this time, the external output is fed back into the aforementioned controlled DC/DC converter, effectively controlling the external output at a consistent level.

In other words, the aforementioned controlled DC/DC bidirectional converter control unit 110 adjusts the output voltage of the aforementioned controlled DC/DC converter 100 according to the output voltage of the LLC resonant converter 200 fed back from the output voltage detector circuit 300. An embodiment of the present invention comprises: a bidirectional converter control unit 110, controlling the on/off of the aforementioned controlled DC/DC converter 100 operating as a boost converter in forward operation; an output voltage detector circuit 300 detecting the output voltage of the aforementioned LLC resonant converter 200 and feeding it back into the bidirectional converter control unit 110; and a constant duty ratio and fixed frequency gate pulse generating circuit 210, controlling the on/off of the LLC resonant converter. Also, the aforementioned bidirectional converter control unit 110 and the aforementioned constant duty ratio and fixed frequency gate pulse generating circuit 210 include a pulse width modulation controller.

The aforementioned DC/DC converter 100, operating as a boost converter 100 during forward operation, comprises: a boost inductor ($L_b$) and a boost rectifier switch ($S_{b1}$) in series connection with the input power source (Vin); and a boost switch ($S_{b2}$) and a boost capacitor ($C_{b1}$) in parallel connection to the aforementioned input power source.

The aforementioned LLC resonant converter 200 comprises: the first and second resonant switches ($S_h$, $S_L$) in series connection; a resonant capacitor ($C_r$) in parallel connection with the aforementioned second resonant switch ($S_L$); the aforementioned resonant inductor ($L_r$) and a primary coil; a secondary coil in the opposite direction to the aforementioned primary coil; and a capacitor (C) in parallel connection with the first and fourth rectifier switches ($S_1$, $S_4$) and with the second and third rectifier switches ($S_2$, $S_3$) joined to the aforementioned secondary coil.

Additionally, a more detailed explanation will now be provided on the forward operation of a high-efficiency bidirectional DC/DC power converter using an unregulated bus converter according to an embodiment of the present invention, with reference to FIG. 3(a).

The high-efficiency DC/DC power converter using an unregulated bus converter according to an embodiment of the invention, as illustrated in FIG. 3(a), when operated in the forward direction, comprises a boost converter 100 and an LLC resonant converter 200. It further comprises: an output voltage detector circuit 300, configured to detect the output voltage of the LLC resonant converter 200; a bidirectional converter control unit 110, configured to control the boost converter 100 through the output voltage detector circuit 300; and a constant duty ratio gate pulse generating circuit 210, configured to control the LLC resonant converter 200.

The boost converter 100 is a step-up converter using switching time and the characteristics of an inductor device. It regulates the output voltage, stepping up the low voltage input and maintaining it at a consistent level.

Such a boost converter 100 comprises: a boost inductor ($L_b$) and boost rectifier switch ($S_{b1}$) in series connection with the input power source; and a boost switch ($S_{b2}$) and boost capacitor ($C_{b1}$) in parallel connection with the input power source.

The boost inductor ($L_b$) is for stepping-up the boost converter 100, and when voltage is applied to both its ends, the electric current increases at a gradient in proportion to the voltage. In other words, when the boost switch ($S_{b2}$) is turned on, an electric current starts flowing through the boost inductor ($L_b$) and a magnetic field is gradually induced around the coil; according to Faraday's law, the electric current increases in proportion to the increase of the magnetic field. Of course, at this time, the direction of the electromotive force is in the direction opposing the magnetic field.

The boost rectifier switch ($S_{b1}$) is for preventing the electric current from flowing toward the boost inductor ($L_b$) when electricity is discharged after the boost capacitor is charged, and is driven in alternating operation with the boost switch ($S_{b2}$).

The boost switch ($S_{b2}$) is for controlling the boost converter 100, and comprises a metal-oxide semiconductor field effect transistor, or MOSFET. Such a boost switch ($S_{b2}$) is switched on/off by the pulse wave confirmed at the boost control 110 and controls the output of the boost converter 100.

The boost capacitor ($C_{b1}$) is for smoothing the output. At the boost converter 100, when the boost switch ($S_{b2}$) is off, the electric current is stored at the boost capacitor ($C_{b1}$), and when the boost switch ($S_{b2}$) is on, it is discharged, thus smoothing the output of the boost converter 100.

With such a boost converter 100, while the boost switch ($S_{b2}$) is on, the input power source is connected to both ends of the boost inductor ($L_b$), allowing the charging of the electric current; when the boost switch ($S_{b2}$) is off, the charged electric current is transferred toward the load. Also, with such a boost converter 100, the electric current of the output unit is always less than the electric current of the input unit, and as there is no loss from the circuit operation in principle, the output voltage always comes out as higher than the input voltage in the equation, input current×input voltage=output current×output voltage.

The LLC resonant converter 200 is for stepping up the output of the boost converter 100, and comprises: first and second resonant switches ($S_h$, $S_L$); a resonant capacitor ($C_r$) in parallel connection with the second resonant switch ($S_L$); a resonant inductor ($L_r$) and a primary coil; a secondary coil in the opposite direction to the primary coil; and a capacitor (C) for the smoothing function in parallel connection with the first and fourth rectifier switches ($S_1$, $S_4$) and with the second and third rectifier switches ($S_2$, $S_3$) joined to the secondary coil.

The first and second resonant switches ($S_h$, $S_L$) are for controlling the LLC resonant converter 200 through constant duty ratio gate pulse generating circuit 210, and as with the boost switch ($S_2$), include metal-oxide semiconductor field effect transistors. At this time, the first resonant switch ($S_h$) is turned on by a high signal of the constant duty ratio gate pulse generating circuit 210, and the second resonant switch ($S_L$) is turned on by a low signal of the constant duty ratio gate pulse generating circuit 210.

The resonant capacitor ($C_r$), together with the leakage inductance resonant inductor ($L_r$), constitutes the resonance tank and determines the resonance frequency. At this time, the resonant inductor ($L_r$) also, together with the resonant capacitor ($C_r$), constitutes the resonance tank and determines the resonance frequency.

The primary and secondary coils form the powering interval, with the first and second switches ($S_h$, $S_L$) on the primary side of the LLC resonant converter 200 being turned on, and at this time, the energy accumulated on the primary coil of the LLC resonant converter 200 is transferred to the secondary coil on the secondary side of the LLC resonant converter 200.

The rectifier switches ($S_1$, $S_2$, $S_3$, $S_4$) are switches for rectification, and have the function of rectifying the energy transferred to the secondary side of the LLC resonant converter 200 as direct current.

The LLC resonant converter 200 according to an embodiment of the invention having the structure described above can operate at a constant duty ratio and fixed frequency because input and output voltages are fixed, and accordingly, an optimum circuit design is possible. Also, it makes for a high efficiency, because: structurally it operates as soft switching, thus vastly reducing the switching loss; and for resonance it uses leakage inductance working from the transformer's loss by the use of the resonant capacitor ($C_r$), thus reducing loss from the transformer when transferring energy. Also, as it uses resonance to transfer energy, it can eliminate the inductor on the output side, thus getting the DC output using the output capacitor only.

The constant duty ratio gate pulse generating circuit 210 is for controlling the LLC resonant converter 200, and to this end, is joined to the first and second resonant switches ($S_h$, $S_L$), controlling the aforementioned first and second resonant switches ($S_h$, $S_L$). The constant duty ratio gate pulse generating circuit 210 may include an ordinary pulse width modulation controller, and accordingly, controls the first and second resonant switches ($S_h$, $S_L$) through a pulse wave. In other words, an embodiment of the present invention can be economical in price, as it uses an ordinary pulse wave modulation controller (PWM controller) in order to control the boost converter 100 and LLC resonant converter 200. Also, by dividing the stress on the conventional one-step converter into two steps, it can increase the overall efficiency of the converter, and it can also decrease the price of the switching device, as it can also reduce the capacity of the switching device.

Also, the constant duty ratio gate pulse generating circuit 210 confirms signals to the first resonant switch ($S_h$), the first and fourth rectifier switches ($S_1$, $S_4$) and the second resonant switch ($S_L$), and the second and third rectifier switches ($S_2$, $S_3$) in the same manner, and each of these operates differently from each other according to the same signals confirmed at the constant duty ratio gate pulse generating circuit 210.

The output voltage detector circuit 300 is for feeding the output of the LLC resonant converter 200 back into the bidirectional converter control unit 110, and measures the output of the LLC resonant converter 200 in real time, transferring it to the bidirectional converter control unit 110.

The aforementioned bidirectional converter control unit 110 controls the boost converter 100 according to the output of the LLC resonant converter 200 detected at the output voltage detector circuit 300. Here, for the bidirectional converter control unit 110, an ordinary pulse width modulation controller may be used, and it controls the pulse's duty ratio, in turn controlling the on/off timing of the boost switch ($S_{b2}$) of the boost converter 100, and thus controlling the output of the boost converter 100.

The high-efficiency bidirectional DC/DC power converter using an unregulated bus converter according to Application Example 1 having the structure described above maintains the low voltage input at approximately 140V, and this voltage, after passing through the transformer of the LLC resonant converter 200, ultimately has the output of approximately 400V. Of course, such input and output voltages of each converter may vary according to the usage of the high-efficiency DC/DC power converter using an unregulated bus converter.

An explanation will now be provided on the operation of the high-efficiency DC/DC power converter using an unregulated bus converter according to Application Example 1, according to an embodiment of the invention having the structure described above. First, when the boost switch ($S_{b2}$) of the boost converter is turned on, a circulating electric current starts flowing through the boost inductor ($L_b$). At this time, the flow of the electric current is somewhat delayed by the boost inductor ($L_b$). At this time, the boost rectifier switch ($S_{b1}$) is open, and the internal diode of the boost rectifier switch ($S_{b1}$) cannot pass the electric current, as the output voltage is applied in the reverse direction. In other words, the boost rectifier switch ($S_{b1}$), when open, has a reverse direction bias with an output potential greater than the input side, and therefore, the internal diode of the boost rectifier switch ($S_{b1}$) does not pass an electric current.

Afterward, when the boost switch ($S_{b2}$) is turned off, the boost inductor ($L_b$) tries to allow the flowing electric current to continue to flow. In other words, even if the boost switch ($S_{b2}$) is off, the electric current of the boost inductor ($L_b$) is not immediately cut off, but rather, gradually decreases by a time constant. Also, due to the boost rectifier switch ($S_{b1}$) being turned on at the same time as the boost switch ($S_{b2}$) being turned off, the boost inductor ($L_b$) current, unable to flow to the boost switch ($S_{b2}$), will then flow through the boost rectifier switch ($S_{b1}$). Also, such an electric current of the boost inductor ($L_b$) charges the boost capacitor ($C_{b1}$). In other words, when the boost switch ($S_{b2}$) is off, the boost inductor, like a current source, causes an electric current to flow by means of the internal magnetic field, and if the boost switch ($S_{b2}$) is turned on again at this time, the electric current applied to the boost converter 100 and the electric current remaining at the boost inductor ($L_b$) are added together, and an even greater electric current is applied to the boost capacitor ($C_{b1}$). Accordingly, the output voltage increases and stepping-up is accomplished, and the electric current decreases. Also, the output of the boost converter 100 is applied as the input of the LLC resonant converter 200.

When the output of the boost converter 100 is applied as the input of the LLC resonant converter 200 and a high signal is input at the constant duty ratio gate pulse generating circuit 210, the second resonant switch ($S_L$) is turned off and the first resonant switch ($S_h$) is turned on. Also, accordingly, the resonant capacitor ($C_r$) is charged, and after the resonant capacitor ($C_r$) is charged, an electric current flows to the resonant inductor ($L_r$). Afterward, the electric current flowing to the resonant inductor ($L_r$) is applied to the primary coil and a magnetic field is formed. The magnetic field formed around the primary coil induces a magnetic field around the secondary coil, and the electric current induced at the secondary coil is output to the output unit through the first rectifier switch ($S_1$) and the fourth rectifier switch ($S_4$), operated by the same signals as the first resonant switch ($S_h$). At this time, the magnetized inductance current increases linearly with the output voltage. Also, the electric current flowing through the first rectifier switch ($S_1$) and the fourth rectifier switch ($S_4$) is charged at the capacitor (C). Also, as the circuit is set in such a way as not to allow the primary coil to participate in resonance, the resonance frequency can be expressed as Equation 1 below:

$$f_r = \frac{1}{2\pi\sqrt{L_r C_r}} \quad \text{[Equation 1]}$$

Also, after the dead-time of the first resonant switch ($S_h$) being off, when the output of the boost converter 100 is applied to the LLC resonant converter 200 as the input and a low signal is input at the constant duty ratio gate pulse generating circuit (210), the second resonant switch ($S_L$) is turned on. Also, accordingly, the resonance current flows in the reverse direction through the second resonant switch ($S_L$), and the electric current charged at the resonant capacitor ($C_r$) is transferred to the secondary side of the LLC resonant converter 200. At this time, on the secondary side of the LLC resonant converter 200, the second and third rectifier switches ($S_2$, $S_3$), operated by the same signals as the second resonant switch ($S_L$), are turned on, and the magnetized inductance current appears to decrease linearly with the output voltage.

Afterward, the electric current flowing through the second resonant switch ($S_L$) during the dead-time interval when the second resonant switch ($S_L$) is off will flow through the internal diode of the first resonant switch ($S_h$). At this time, the magnetized current no longer increases and no energy is transferred to the secondary side of the LLC resonant converter 200.

A description will now be provided on the operation in the reverse direction with reference to the circuit diagram in FIG. 3(b).

In FIG. 3(b) the unregulated LLC resonant converter 200, configured to provide the function of a fixed step-down rate according to the insulation between input and output and the turn ratio of the transformer, receives the external input voltage and outputs it as the input of the controlled DC/DC converter 100. At this time, the external output is fed back into the aforementioned controlled DC/DC converter 100 and the external output is effectively controlled to a consistent level.

In other words, the aforementioned controlled DC/DC bidirectional converter control unit 110 controls the external output voltage by adjusting the output voltage of the aforementioned controlled DC/DC converter 100 according to the external output voltage fed back at the output voltage detector circuit 300. An embodiment of the present invention comprises: the bidirectional converter control unit 110 configured to control the on/off of the aforementioned controlled DC/DC converter 100 operating as a buck converter in a reverse drive; the output voltage detector circuit 300 configured to detect the aforementioned external output voltage and to feed it back to the aforementioned bidirectional converter control unit 110; and the constant duty ratio and fixed frequency gate pulse generating circuit 210 configured to control the on/off of the LLC resonant converter 200. Also, the aforementioned bidirectional converter control unit 110 and the aforementioned constant duty ratio and fixed frequency gate pulse generating circuit 210 include a pulse width modulation controller.

The aforementioned LLC resonant converter 200 comprises: a capacitor (C) and a primary coil (in a forward drive, corresponds to a secondary coil) in parallel connection with the first and fourth switches ($S_1$, $S_4$) and the second and third switches ($S_2$, $S_3$) converting direct current voltage into alternating current voltage in alternating operation; a secondary coil (in a forward drive, corresponds to a primary coil) in the opposite direction to the aforementioned primary coil; a resonant inductor ($L_r$) and a resonant capacitor ($C_r$) in series connection with the aforementioned secondary coil; first and second resonant switches ($S_h$, $S_L$) configured to perform rectification and resonance, and joined to the aforementioned resonant capacitor ($C_r$).

The aforementioned unregulated DC/DC converter 100 configured to operate as a buck converter in a reverse drive includes: a buck converter ($L_b$) and a buck converter switch ($S_{b1}$) in series connection with the input power source; and a buck rectifier switch ($S_{b2}$) and a buck capacitor in parallel connection with the aforementioned input power source.

Additionally, a more detailed explanation will now be provided with reference to FIG. 3(b) regarding the reverse direction operation of a high-efficiency DC/DC power converter using an unregulated bus converter according to an embodiment of the present invention.

To explain the operation of the LLC resonant converter 200 through FIG. 3(b), when an input is applied to the LLC resonant converter and the first rectifier switch ($S_1$), the fourth switch ($S_4$) and the first resonant switch ($S_h$) are turned on, the electric current on the input side is applied to the transformer's primary coil and a magnetic field is formed. In other words, due to the magnetic field formed around the primary coil, a magnetic field is induced on the secondary coil, the electric current induced on the secondary coil charges the resonant capacitor ($C_r$) when the first resonant switch ($S_h$) is on, and after the resonant capacitor ($C_r$) is charged, an electric current will flow to the resonant inductor ($L_r$). Here again, the magnetized inductance current increases linearly with the output voltage. This electric current flows through the first resonant switch ($S_h$), and the output voltage of the LLC resonant converter is charged at the capacitor ($C_{b1}$) also.

During the interval when the second switch ($S_2$), the third switch ($S_3$), and the second resonant switch ($S_L$) are on, the electric current in the input side coil flows in the reverse direction, and accordingly, a magnetic field is induced around the secondary coil and the electric current charged at the resonant capacitor ($C_r$) is discharged. At this time the magnetized inductance current appears to decrease linearly with the output voltage and the output voltage of the LLC resonant converter is maintained by the voltage charged at the capacitor ($C_{b1}$).

To explain the operation principle of the buck converter, the output of the aforementioned LLC resonant converter is input into the buck converter. When the buck converter switch ($S_{b1}$) is turned on, an electric current will flow through the buck converter inductor ($L_b$). At this time the buck converter rectifier switch ($S_{b2}$) is turned off and cannot pass the electric current. Afterward, even if the buck converter switch ($S_{b1}$) is turned off, the buck inductor ($L_b$) tries to allow the flowing electric current to continue to flow. In other words, even if the buck converter switch ($S_{b1}$) is turned off, the electric current of the buck inductor is not immediately cut off, but rather, decreases gradually by a time constant.

Also, when the buck converter switch ($S_{b1}$) is off, the buck converter rectifier switch ($S_{b2}$) is on, forming a passage for the buck converter's inductor current and allowing it to flow continuously. Also, such an electric current of the buck converter inductor ($L_b$) charges the capacitor ($C_{b2}$) on the output side of the buck converter. In other words, when the buck converter switch ($S_{b1}$) is turned off, the buck inductor ($L_b$), like a current source, causes an electric current to flow by means of the internal magnetic field, and at this time, a volt-.sec equilibrium condition applies, stepping down the voltage as output.

Application Example 2

Figure 4A:
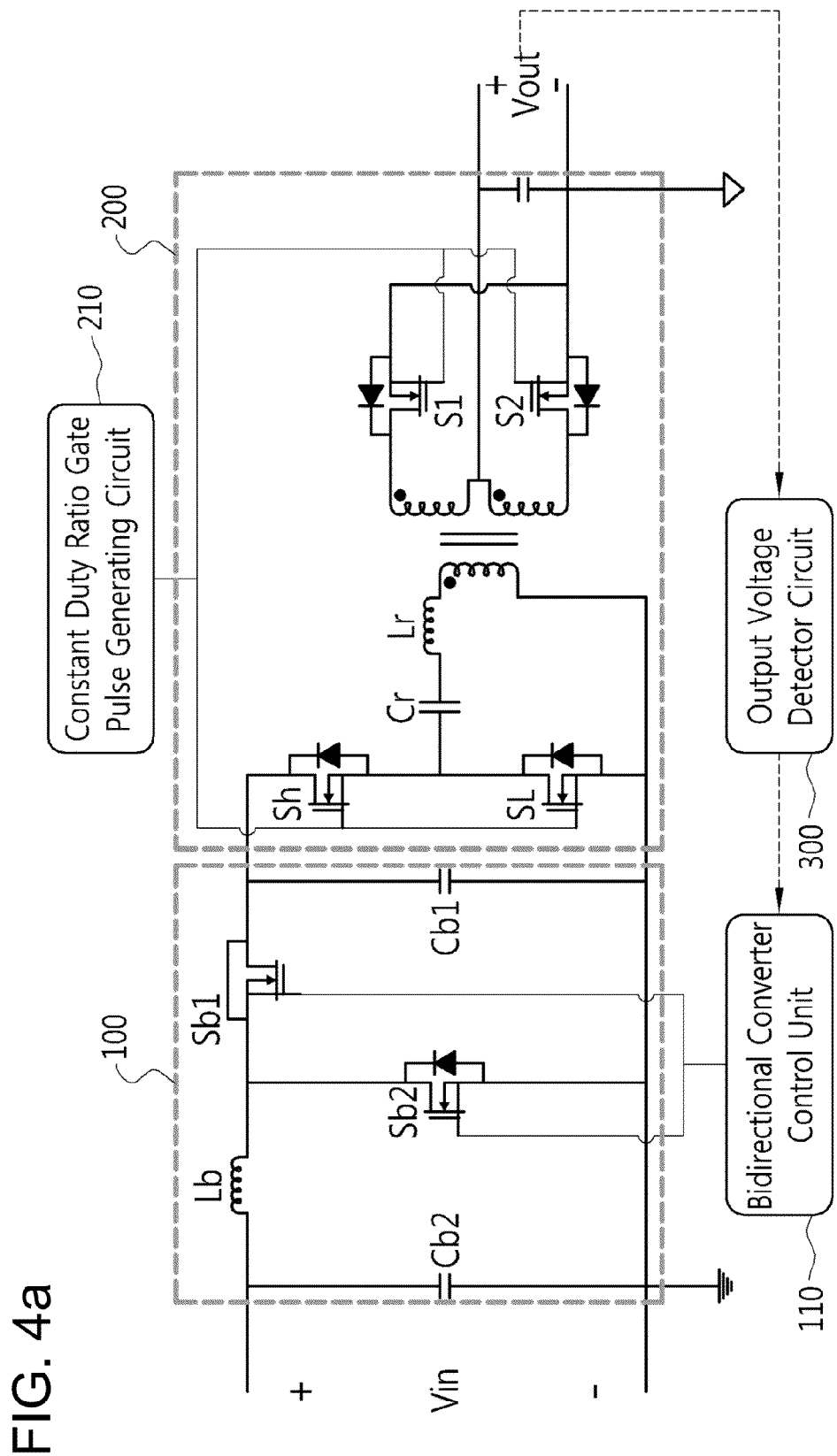
FIGS. 4(a) and 4(b) are circuit diagrams of the high-efficiency bidirectional DC/DC power converter using an unregulated bus converter according to a preferred embodiment of the present invention.
Figure 4B:
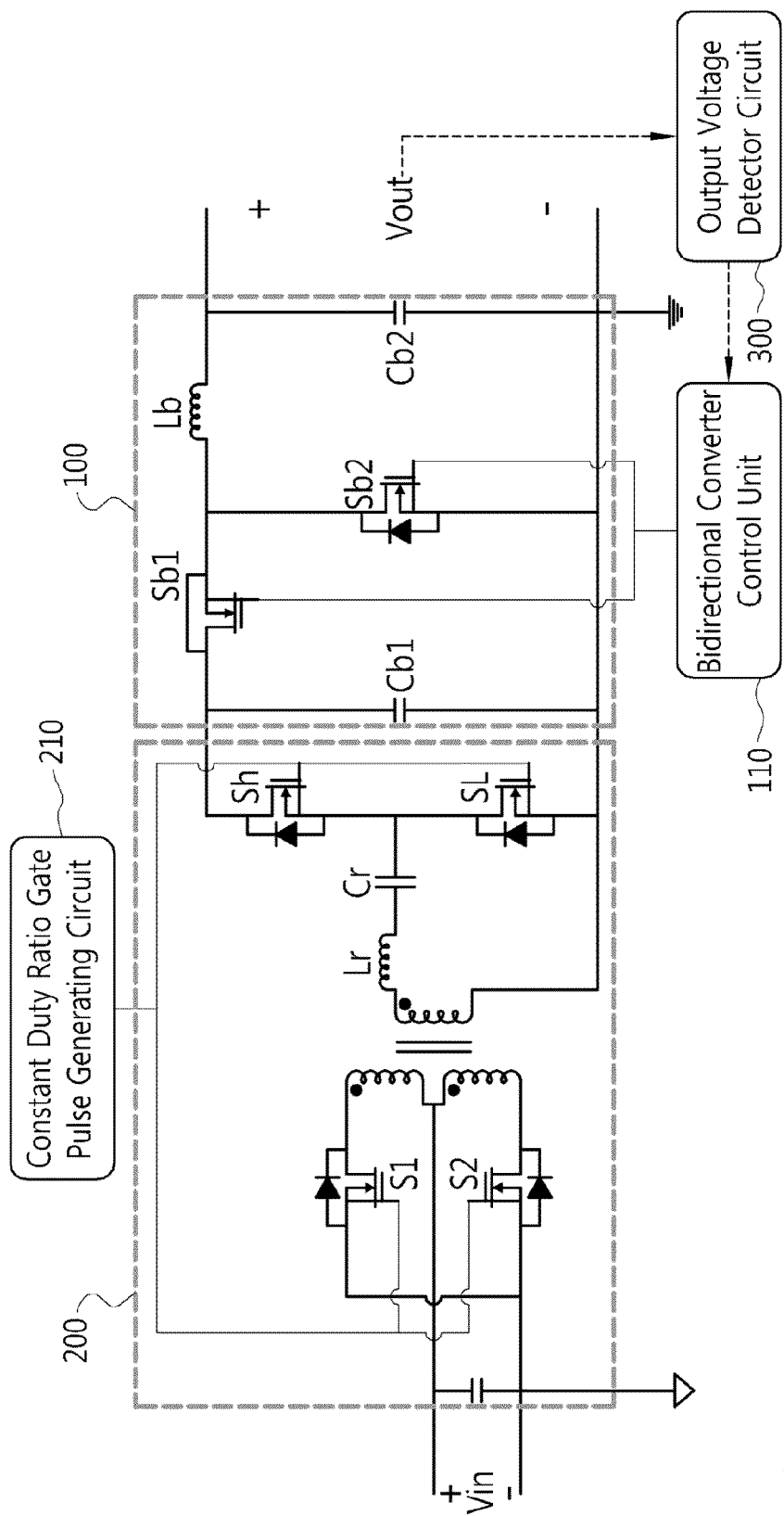

Next, an explanation will be provided on the high-efficiency DC/DC power converter using an unregulated bus converter according to an embodiment of the invention, with reference to FIGS. 4(a) and 4(b). In the description below, parts that overlap with the explanation provided above in Application Example 1 on the high-efficiency DC/DC power converter using an unregulated bus converter according to an embodiment of the invention will be omitted or abbreviated.

FIGS. 4(a) and 4(b) are circuit diagrams of the high-efficiency bidirectional DC/DC power converter using an unregulated bus converter according to a preferred embodiment of the present invention.

A high-efficiency DC/DC power converter using an unregulated bus converter according to Application Example 2, when operated in the forward direction, as illustrated in FIG. 4(a), comprises a booster converter 100 and an LLC resonant converter 200. It further comprises: an output voltage detector circuit 300, configured to detect the output voltage of the LLC resonant converter 200; a bidirectional converter control unit 110, configured to control the boost converter 100 through the output voltage detector circuit 300; and a constant duty ratio gate pulse generating circuit 210, configured to control the LLC resonant converter 200.

The boost converter 100, with regards to an embodiment of the present invention, steps up the wide-ranging input and maintains it at a consistent level, regulating the output voltage, in the same manner as the high-efficiency DC/DC power converter using an unregulated bus converter according to Application Example 1. Also, the boost converter 100 according to Application Example 2 likewise comprises: a boost inductor ($L_b$) and a boost rectifier switch ($S_{b1}$) in series connection with the input power source; and a boost switch ($S_{b2}$) and a boost capacitor ($C_{b1}$) in parallel connection with the input power source.

The LLC resonant converter 200 is for stepping up the output of the boost converter 100, and comprises: first and second resonant switches ($S_h$, $S_L$); a resonant capacitor ($C_r$), a resonant inductor ($L_r$) and a primary coil in parallel connection with the second resonant switch ($S_L$); secondary coils in the opposite direction to the primary coil; first and second resonant switches ($S_1$, $S_2$) joined to the two secondary coils respectively and configured to operate the two secondary coils differently from each other; and a capacitor (C) joined to the output unit.

An explanation will now be provided on the operation of the high-efficiency DC/DC power converter using an unregulated bus converter according to Application Example 2, as an embodiment of the present invention having the structure described above. First, when the boost switch ($S_{b2}$) of the boost converter 100 is turned on, a circulating electric current will flow through the boost switch. At this time, the flow of the electric current will be somewhat delayed by the boost inductor ($L_b$).

At this time, the boost rectifier switch ($S_{b1}$) is off, and the internal diode of the boost rectifier switch ($S_{b1}$) has the output voltage applied in the reverse direction, thus unable to pass the electric current. In other words, as the boost rectifier switch ($S_{b1}$), when turned off, has the reverse bias with the output potential greater than the input side, the internal diode of the boost rectifier switch ($S_{b1}$) does not have an electric current flowing.

Afterward, when the boost switch is turned off, the boost inductor ($L_b$) tries to allow the flowing electric current to continue to flow. In other words, even if the boost switch ($S_{b2}$) is turned off, the electric current of the boost inductor ($L_b$) is not immediately cut off, but rather, gradually decreases by a time constant. Also, due to the boost rectifier switch ($S_{b1}$) being on at the same time as the boost switch ($S_{b2}$) being off, the boost inductor ($L_b$) current, unable to flow to the boost switch ($S_{b2}$), will flow through the boost rectifier switch ($S_{b1}$). Also, such an electric current of the boost inductor ($L_b$) charges the boost capacitor ($C_{b1}$). In other words, when the boost switch ($S_{b2}$) is turned off, the boost inductor ($L_b$), like a current source, will cause an electric current to flow by means of the internally existing magnetic field, and at this time, if the boost switch ($S_{b2}$) is turned on again, the electric current applied to the boost converter 100 and the electric current remaining in the boost inductor ($L_b$) are added together, and a greater electric current is applied to the boost capacitor ($C_{b1}$). Accordingly, the output voltage increases, achieving a step-up, and the electric current decreases. Also, the output of the boost converter 100 is applied to the LLC resonant converter 200 as input.

When the output of the boost converter 100 is applied to the LLC resonant converter 200 as input and a high signal is input at the constant duty ratio gate pulse generating circuit 210, the second resonant switch ($S_L$) is turned off and the first resonant switch is turned on. Also, accordingly, the resonant capacitor ($C_r$) is charged, and after the resonant capacitor ($C_r$) is charged an electric current will flow to the resonant inductor ($L_r$). Afterward, the electric current flowing to the resonant inductor ($L_r$) is applied to the primary coil and a magnetic field is formed. Due to the magnetic field formed around the primary coil, a magnetic field is induced around the secondary coil, and the electric current induced around the secondary coil is output to the output unit by the first rectifier switch ($S_1$). Also, the electric current caused to flow by the first rectifier switch ($S_1$) is charged at the capacitor (C).

Also, after the dead-time when the first resonant switch ($S_h$) is turned off, when the output of the boost converter 100 is applied to the LLC resonant converter 200 as input and a low signal is input at the constant duty ratio gate pulse generating circuit 210, the second resonant switch ($S_L$) is turned on. Also, accordingly, the resonance current flows through the second resonant switch ($S_L$) in the reverse direction, and the electric current charged at the resonant capacitor ($C_r$) is transferred to the secondary side of the LLC resonant converter 200. At this time, powering of the secondary side of the LLC resonant converter 200 is done through the second rectifier switch ($S_2$).

Afterward, during the dead-time interval when the first resonant switch ($S_h$) is turned off, the electric current flowing through the first resonant switch ($S_h$) will flow through the internal diode of the second resonant switch ($S_L$). At this time, the magnetized electric current no longer increases and no energy is transferred to the secondary side of the LLC resonant converter 200.

A detailed explanation will now be provided on the reverse direction operation of the high-efficiency DC/DC power converter using an unregulated bus converter according to Application Example 2.

To explain the operation of the LLC resonant converter with reference to FIG. 4(b), when the LLC resonant converter 200 is input and the first rectifier switch ($S_1$) and the first resonant switch ($S_h$) are turned on, the input side electric current is applied to the transformer's primary coil (corresponds to secondary coil in forward direction) and a magnetic field is formed. In other words, due to the magnetic field formed around the primary coil, a magnetic field is induced around the secondary coil (corresponds to primary coil in forward direction), and the electric current induced around the secondary coil, while the first resonant switch ($S_h$) is on, charges the resonant capacitor ($C_r$). After the resonant capacitor ($C_r$) is charged, an electric current will flow to the resonant inductor ($L_r$). Here again, the magnetized inductance current increases linearly with the output voltage. This electric current flows through the first resonant switch ($S_h$), and the output voltage of the LLC resonant converter 200 is charged at the capacitor ($C_{b1}$) also.

In the interval when the second rectifier switch ($S_2$) and the second resonant switch ($S_L$) are turned on, the electric current in the input side coil flows in the reverse direction. Accordingly, a magnetic field is induced around the secondary coil, and the electric current charged at the resonant capacitor ($C_r$) is discharged. At this time, the magnetized inductance current appears to decrease linearly with the output voltage, and the LLC resonant converter's output voltage is maintained by the voltage charged at the capacitor ($C_{b1}$).

To explain the operational principle of the buck converter, the output of the aforementioned LLC resonant converter becomes the input of the buck converter. When the buck converter switch ($S_{b1}$) is turned on, an electric current will flow through the buck converter inductor ($L_b$). At this time, the buck converter rectifier switch ($S_{b2}$) is turned off and cannot pass the electric current. Afterward, even if the buck converter switch ($S_{b1}$) is turned off, the buck inductor tries to allow the flowing electric current to continue to flow. In other words, even if the buck converter switch ($S_{b1}$) is turned off, the electric current in the buck converter is not immediately cut off, but rather, gradually decreases by a time constant. Also, when the buck converter switch ($S_{b1}$) is off, the buck converter rectifier switch ($S_{b2}$) is turned on, forming a passage for the buck converter's inductor current, allowing the electric current to flow continuously. Also, such an electric current of the buck converter inductor ($L_b$) charges the capacitor ($C_{b2}$) on the output side of the buck converter. In other words, when the buck converter switch ($S_{b1}$) is turned off, the inductor ($L_b$), like a current source, will cause an electric current to flow by means of the internally existing magnetic field, and at this time, a volt.sec equilibrium condition applies, stepping down the voltage as output.

Application Example 3

Figure 5A:
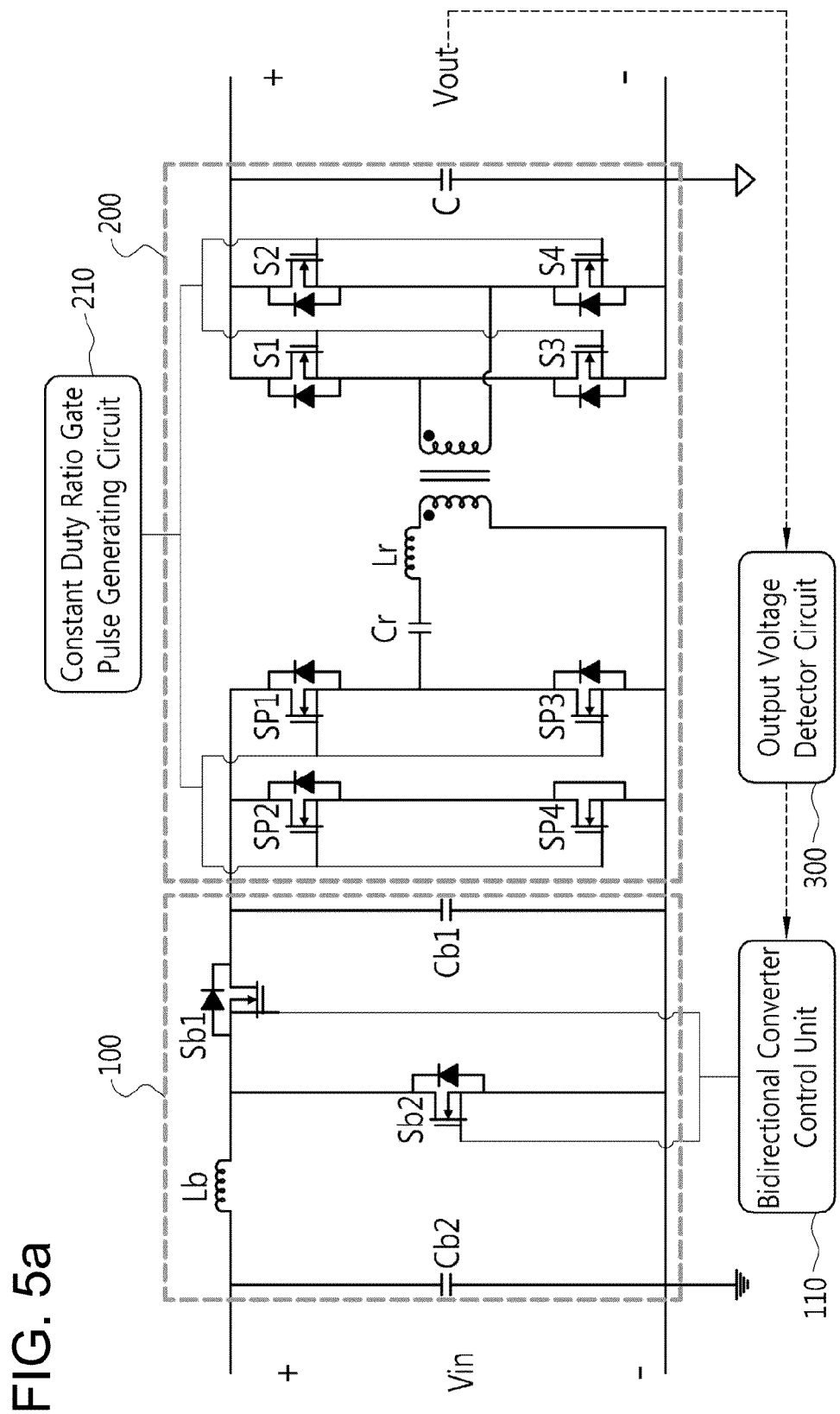
FIGS. 5(a) and 5(b) are circuit diagrams of the high-efficiency bidirectional DC/DC power converter using an unregulated bus converter according to a preferred embodiment of the present invention.
Figure 5B:
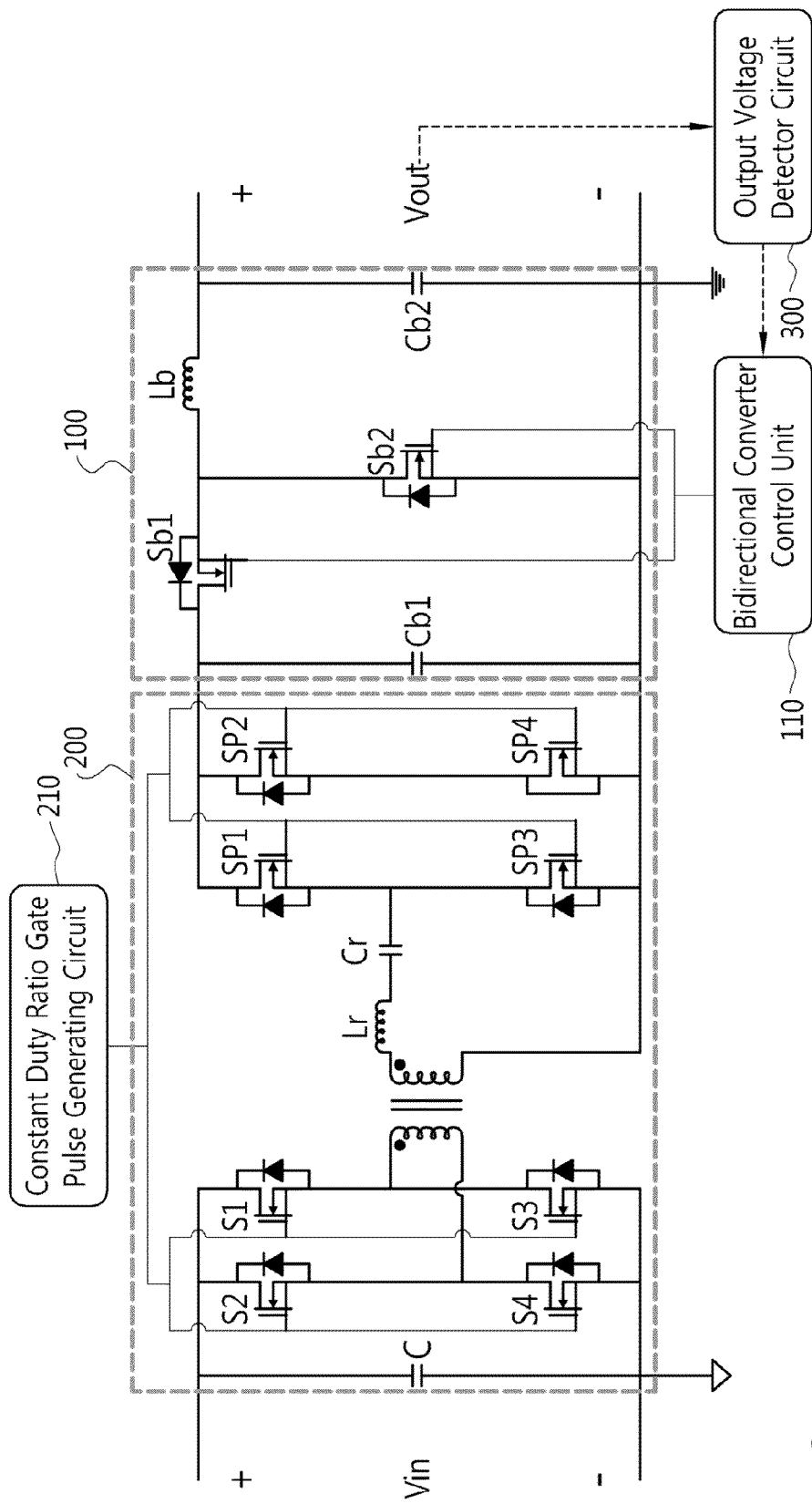

FIGS. 5(a) and 5(b) are circuit diagrams of the high-efficiency bidirectional DC/DC power converter using an unregulated bus converter according to a preferred embodiment of the present invention. It is an application example wherein the first resonant switches ($S_{p1}$, $S_{p4}$) and the second resonant switches ($S_{p2}$, $S_{p3}$) on the primary side are in pairs, consisting of four switches in total.

According to an embodiment of the present invention, the high-efficiency DC/DC power converter using an unregulated bus converter, when the operation is in the forward direction, as illustrated in FIG. 5(a), comprises: a boost converter 100; and an LLC resonant converter 200. Also, it further comprises: an output voltage detector circuit 300, configured to detect the output voltage of the LLC resonant converter 200; a bidirectional converter control unit 110, configured to control the boost converter 100 by the output voltage detector circuit 300; and a constant duty ratio gate pulse generating circuit 210, configured to control the LLC resonant converter 200.

The boost converter 100 is a step-up converter using the switching time and inductor device, and regulates the output voltage by stepping up the low voltage input and maintaining it at a consistent level.

Such a boost converter 100 comprises: a boost inductor ($L_b$) and a boost rectifier switch ($S_{b1}$) in series connection with the input power source; and a boost switch ($S_{b2}$) and a boost capacitor ($C_{b1}$) in parallel connection with the input power source.

The boost inductor ($L_b$) is for stepping up the boost converter 100, and when a voltage is applied to its both ends, the electric current increases at a gradient proportionate to that voltage. In other words, when the boost switch ($S_{b2}$) is turned on, an electric current will flow through the boost inductor ($L_b$), and when a magnetic field is gradually induced, the electric current increases to the extent that the magnetic field increases, according to Faraday's law. Of course, at this time the direction of the electromotive force is in the direction opposing the magnetic field.

The boost resonant switch ($S_{b1}$) is for preventing the electric current from flowing to the boost inductor ($L_b$) when the boost capacitor ($C_{b1}$) is charged and then discharged, and is driven in alternate operation with the boost switch ($S_{b2}$).

The boost switch ($S_{b2}$) is for controlling the boost converter 100, and includes a metal-oxide semiconductor field effect transistor, or MOSFET. Such a boost switch ($S_{b2}$) is turned on/off by the pulse wave applied to the boost control unit 110, controlling the output of the boost converter 100.

The boost capacitor ($C_{b1}$) is for smoothing, and at the boost converter 100, the electric current, after being stored at the boost capacitor ($C_{b1}$) when the boost switch ($S_{b2}$) is turned off, is discharged when the boost switch ($S_{b2}$) is turned on, smoothing the output of the boost converter 100.

With such a boost converter 100, while the boost switch ($S_{b2}$) is turned on, the input power source is connected to both ends of the boost inductor ($L_b$) and an electric current is charged, and when the boost switch ($S_{b2}$) is turned off, the charged electric current is transferred toward the load. Also, with such a boost converter 100, the electric current of the output unit is always less than the electric current of the input unit, and because there is no loss in principle of the circuit operation, the output voltage always appears as greater than the input voltage in the equation, input current×input voltage=output current×output voltage.

The LLC resonant converter 200 is for stepping up the output of the boost converter 100, and comprises: two pairs of first resonant switches ($S_{p1}$, $S_{p4}$) and second resonant switches ($S_{p2}$, $S_{p3}$); a resonant capacitor ($C_r$), a resonant inductor ($L_r$) and a primary coil in parallel connection with the second resonant switches ($S_{p2}$, $S_{p3}$); a secondary switch in the opposite direction to the primary switch; and a capacitor (C) configured to perform the smoothing function and in parallel connection with the first rectifier switches ($S_1$, $S_4$) and the second rectifier switches ($S_2$, $S_3$) joined to the secondary coil.

The first resonant switches ($S_{p1}$, $S_{p4}$) and second resonant switches ($S_{p2}$, $S_{p3}$) are for controlling the LLC resonant converter 200 by means of the constant duty ratio gate pulse generating circuit 210, and, as with the boost switch ($S_{b2}$), comprise metal-oxide semiconductor field effect transistors, or MOSFETs. Here, the first resonant switches ($S_{p1}$, $S_{p4}$) are turned on by a high signal from the constant duty ratio gate pulse generating circuit 210, and the second resonant switches ($S_{p2}$, $S_{p3}$) are turned on by a low signal from the constant duty ratio gate pulse generating circuit 210.

The resonant capacitor ($C_r$), together with the leakage inductance resonant inductor ($L_r$), constitutes the resonance tank, and determines the resonance frequency. Here again, the resonant inductor ($L_r$), together with the resonant capacitor ($C_r$), constitutes the resonance tank, and determines the resonance frequency.

The primary and secondary coils form powering intervals as the first resonant switches ($S_{p1}$, $S_{p4}$) and the second resonant switches ($S_{p2}$, $S_{p3}$) on the primary side of the LLC resonant converter 200 are turned on, and at this time, the energy stored in the primary coil of the LLC resonant converter is transferred to the secondary coil on the secondary side of the LLC resonant converter 200.

The first rectifier switches ($S_1$, $S_4$) and the second rectifier switches ($S_2$, $S_3$) are switches for rectification, and have the function of rectifying as direct current voltage the energy transferred to the secondary side of the LLC resonant converter 200.

The LLC resonant converter 200 according to an embodiment of the present invention having the structure described above can operate at a constant duty ratio and a fixed frequency, as the input and output voltages are fixed, and accordingly, makes the optimal circuit design possible. Also, it makes for a high efficiency, because: structurally it operates as soft switching, thus vastly reducing the switching loss; and for resonance it uses leakage inductance working from the transformer's loss by the use of the resonant capacitor ($C_r$), thus reducing loss from the transformer when transferring energy. Also, as it uses resonance to transfer energy, it can eliminate the inductor on the output side, thus getting the DC output using the output capacitor only.

The constant duty ratio gate pulse generating circuit 210 is for controlling the LLC resonant converter 200; to this end, it is joined to the first resonant switches ($S_{p1}$, $S_{p4}$) and to the second resonant switches ($S_{p2}$, $S_{p3}$), and controls the first resonant switches ($S_{p1}$, $S_{p4}$) and the second resonant switches ($S_{p2}$, $S_{p3}$). The constant duty ratio gate pulse generating circuit 210 may comprise an ordinary pulse width modulation controller, and accordingly, by means of pulse wave, controls the first resonant switches ($S_{p1}$, $S_{p4}$) and the second resonant switches ($S_{p2}$, $S_{p3}$). In other words, as the present invention uses an ordinary pulse width modulation controller (PWM controller) in order to control the boost converter 100 and the LLC resonant converter 200, its price is economical. Also, by dividing the stress on the existing one-unit converter into two units, it can increase the overall efficiency of the converter, and also by lowering the capacity of the switching device, it can lower the price of the switching device.

Also, the constant duty ratio gate pulse generating circuit 210 equally applies signals to the first resonant switches ($S_{p1}$, $S_{p4}$), the first rectifier switches ($S_1$, $S_4$), the second resonant switches ($S_{p2}$, $S_{p3}$), and the second rectifier switches ($S_2$, $S_3$), and each of them operates differently from the others according to the same signals applied to the constant duty ratio gate pulse generating circuit 210.

The output voltage detector circuit 300 is for feeding back the output of the LLC resonant converter 200 into the boost control unit 110, and measures the output of the LLC resonant converter 200 in real time, transferring it to the bidirectional converter control unit 110.

The bidirectional converter control unit 110 controls the boost converter 100 according to the output of the LLC resonant converter 200 detected at the output voltage detector circuit 300. Here, for the boost control unit 110, an ordinary pulse width modulation controller may be used, and it controls the output of the boost converter 100 by controlling the duty ratio of the pulse and by controlling the on/off timing of the boost switch of the boost converter 100.

The high-efficiency DC/DC power converter using an unregulated bus converter according to the application example having the structure described above maintains the low voltage input at approximately 140V, and this voltage outputs at approximately 400V through the LLC resonant converter 200. Of course, the output voltage of such a converter may vary according to the usage of the high-efficiency DC/DC power converter using an unregulated bus converter.

An explanation will now be given on the operation of a high-efficiency DC/DC power converter using an unregulated bus converter according to an embodiment of the invention having the structure described above with reference to Application Example 3. First, when the boost switch ($S_{b2}$) of the boost converter 100 is turned on, a circulating electric current will flow through the boost inductor ($L_b$). At this time, the flow of the electric current is somewhat delayed by the boost inductor ($L_b$). At this time, the boost rectifier switch ($S_{b1}$) is off, and the internal diode of the switch ($S_{b1}$) cannot pass the electric current, as the output voltage is applied in the reverse direction. In other words, while the boost rectifier switch ($S_{b1}$) is off, there is a reverse direction bias with an output electric potential greater than input, and no electric current flows through the internal diode of the boost rectifier switch ($S_{b1}$).

Afterward, when the boost switch ($S_{b2}$) is turned off, the boost inductor ($L_b$) tries to allow the flowing electric current to continue to flow. In other words, even if the boost switch ($S_{b2}$) is turned off, the electric current of the boost inductor ($L_b$) is not immediately cut off, but rather, gradually decreases by a time constant. Also, due to the boost rectifier switch ($S_{b1}$) being turned on at the same as the boost switch ($S_{b2}$) being off, the electric current of the boost inductor ($L_b$), unable to flow to the boost switch ($S_{b2}$), will flow through the boost rectifier switch ($S_{b1}$). Also, such an electric current of the boost inductor ($L_b$) charges the boost capacitor ($C_{b1}$). In other words, when the boost switch ($S_{b2}$) is turned off, the boost inductor ($L_b$), like a current source, causes an electric current to flow by means of the internally existing magnetic field; at this time, if the boost switch ($S_{b2}$) is turned on again, the electric current applied to the boost converter 100 and the electric current remaining at the boost inductor ($L_b$) are added together, and a greater electric current is applied to the boost capacitor ($C_{b1}$). Accordingly, the output voltage increases, achieving a step-up, and the electric current decreases. Also, the output of the boost converter 100 is applied to the LLC resonant converter 200 as input.

When the output of the boost converter 100 is applied to the LLC resonant converter 200 as input and a high signal is input at the constant duty ratio gate pulse generating circuit 210, the second resonant switches ($S_{p2}$, $S_{p3}$) are turned off, and the first resonant switches ($S_{p1}$, $S_{p4}$) are turned on. Also, accordingly, the resonant capacitor ($C_r$) is charged, and after the resonant capacitor ($C_r$) is charged, an electric current will flow to the resonant inductor ($L_r$). Afterward, the electric current flowing to the resonant inductor ($L_r$) is applied to the primary coil ($L_p$), and a magnetic field is formed. Due to the magnetic field formed around the primary coil, a magnetic field is induced around the secondary coil ($L_b$), and the electric current induced in the secondary coil ($L_b$) is output to the output unit through the first rectifier switches ($S_1$, $S_4$) operated by the same signals as the first resonant switches ($S_{p1}$, $S_{p4}$). At this time, the magnetized inductance current increases linearly with the output voltage. Also, the electric current flowing through the first rectifier switches ($S_1$, $S_4$) are charged also at the capacitor (C). Also, as the circuit is set in such a way as not to allow the primary coil ($L_p$) to participate in the resonance, the resonance frequency may be expressed as Equation 2.

$$f_r = \frac{1}{2\pi\sqrt{L_r C_r}} \quad \text{[Equation 2]}$$

Also, after the dead-time of the first resonant switches ($S_{p1}$, $S_{p4}$) being off, when the output of the boost converter 100 is applied to the LLC resonant converter 200 as input and a low signal is input to the constant duty ratio gate pulse generating circuit 210, the second resonant switches ($S_{p2}$, $S_{p3}$) are turned on. Also, accordingly, the resonance current flows through the second resonant switches ($S_{p2}$, $S_{p3}$) in the reverse direction, the resonant capacitor ($C_r$) is discharged and reverse charged, and at this time the electric current is transferred to the secondary side of the LLC resonant converter 200. At this time, on the secondary side of the LLC resonant converter 200, the second rectifier switches ($S_2$, $S_3$), operated by the same signals as the second resonant switches ($S_{p2}$, $S_{p3}$), are turned on, and the magnetized inductance current appears to decrease linearly with the output voltage.

Afterward, in the dead-time interval when the second resonant switches ($S_{p2}$, $S_{p3}$) are off, the electric current flowing through the second resonant switches ($S_{p2}$, $S_{p3}$) will flow through the internal diodes of the first resonant switches ($S_{p1}$, $S_{p4}$). At this time, the magnetized electric current no longer increases, and no energy is transferred to the secondary side of the LLC resonant converter 200.

A detailed explanation will now be provided on the reverse operation of the high-efficiency DC/DC power converter using an unregulated bus converter according to Application Example 3.

To explain the reverse operation of the LLC resonant converter with reference to FIG. 5(*b*), when an input is applied to the LLC resonant converter and the first rectifier switches ($S_1$, $S_4$) and the first resonant switches ($S_{p1}$, $S_{p4}$) are turned on, an input side electric current is applied to the primary coil of the transformer, and a magnetic field is formed. In other words, due to the magnetic field formed around the primary coil, a magnetic field is induced around the secondary coil; the electric current induced around the secondary coil charges the resonant capacitor ($C_r$) while the first resonant switches ($S_{p1}$, $S_{p4}$) are on, and after the resonant capacitor ($C_r$) is charged, an electric current will flow to the resonant inductor ($L_r$). Here again, the magnetized inductance current increases linearly with the output voltage. This electric current at this time flows through the first resonant switches ($S_{p1}$, $S_{p4}$) configured to perform the rectification function, and the output voltage of the LLC resonant converter is charged at the capacitor ($C_{b1}$) also.

In the interval when the second rectifier switches ($S_2$, $S_3$) and the second resonant switches ($S_{p2}$, $S_{p3}$) are turned on, the electric current on the input side coil flows in the reverse direction, and accordingly, a magnetic field is induced around the secondary coil, and the electric current charged at the resonant inductor ($C_r$) is discharged and reverse charged. At this time the magnetized inductance current appears to decrease linearly with the output voltage.

Accordingly, when operated in the reverse direction, the aforementioned first resonant switches ($S_{p1}$, $S_{p4}$) and second resonant switches ($S_{p2}$, $S_{p3}$) perform the rectification function for direct current output.

To explain the operational principle of the buck converter, the output of the aforementioned LLC resonant converter becomes the input of the buck converter. When the buck converter switch ($S_{b1}$) is turned on, an electric current will flow through the buck converter inductor ($L_b$). At this time the buck converter rectifier switch ($S_{b2}$) is off and cannot pass the electric current. Afterward, even if the buck converter switch ($S_{b1}$) is turned off, the buck converter tries to allow the flowing electric current to continue to flow. In other words, even if the buck converter switch ($S_{b1}$) is turned off, the electric current of the buck inductor is not immediately cut off, but rather, gradually decreases by a time constant. Also, when the buck converter switch ($S_{b1}$) is off, the buck converter rectifier switch ($S_{b2}$) is turned on, forming a passage for the buck converter's inductor current and allowing the current to flow continuously. Also, such an electric current of the buck converter inductor ($L_b$) charges the capacitor ($C_{b2}$) on the buck converter's output side. In other words, when the buck converter switch ($S_{b1}$) is turned off, the buck inductor ($L_b$), like a current source, causes an electric current to flow by means of the internally existing magnetic field; at this time a volt·sec equilibrium condition applies and the voltage is stepped down as output.

Application Example 4

Figure 6A:
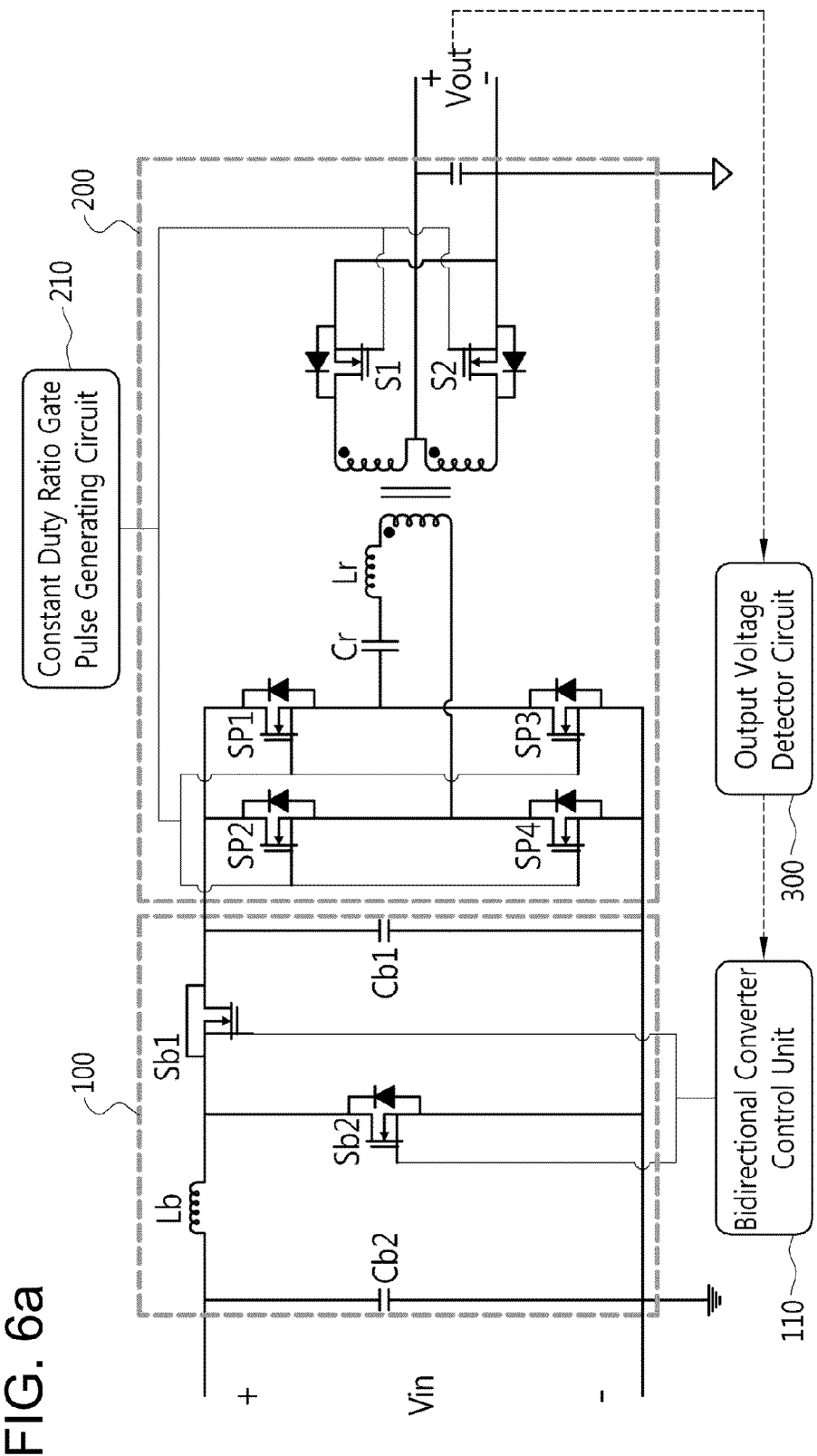
FIGS. 6(a) and 6(b) are circuit diagrams of the high-efficiency bidirectional DC/DC power converter using an unregulated bus converter according to a preferred embodiment of the present invention.
Figure 6B:
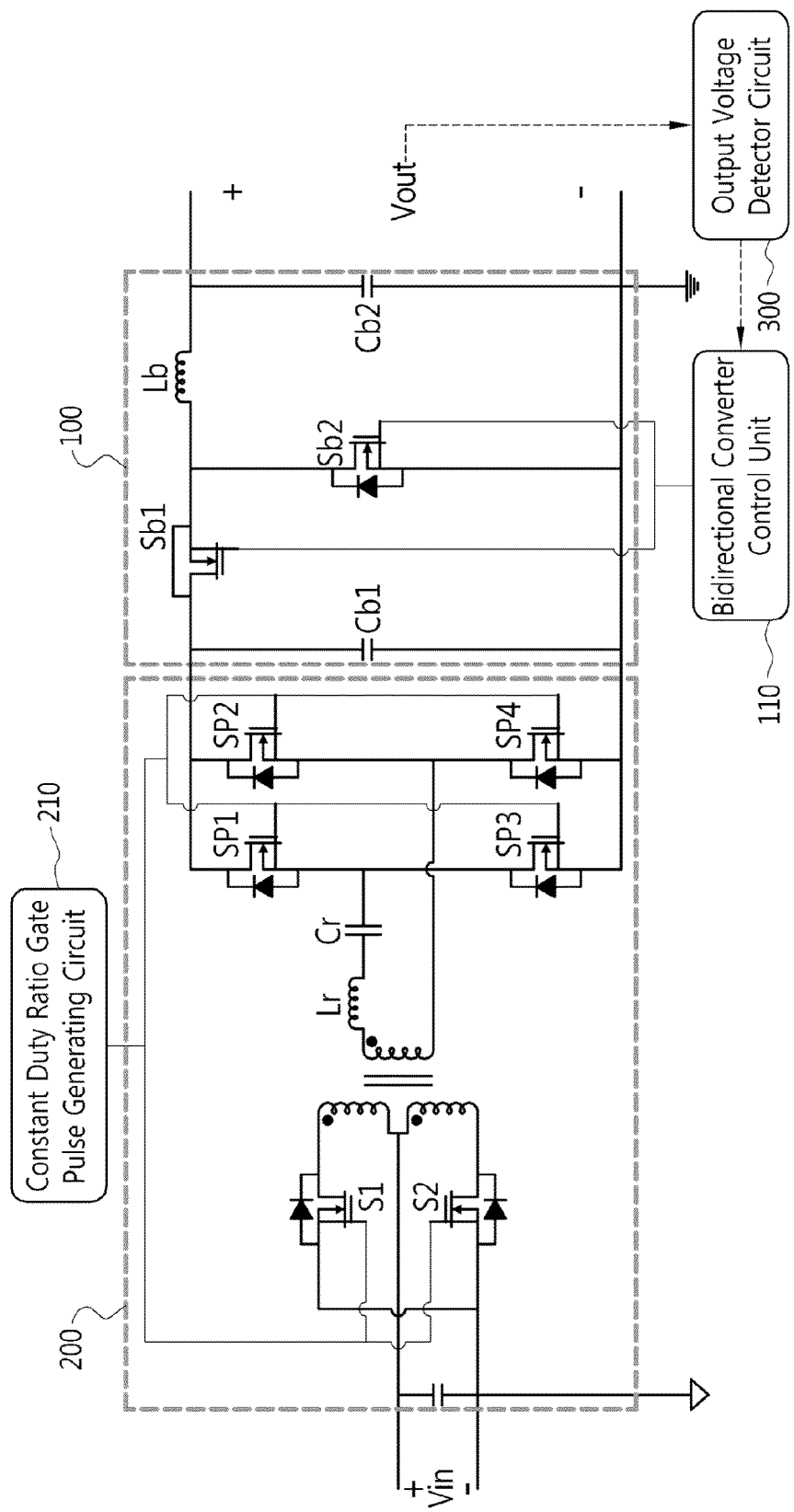

Next, an explanation will be provided on the high-efficiency DC/DC power converter using an unregulated bus converter according to an embodiment of the present invention, with reference to FIGS. 6(*a*) and 6(*b*). In the description below, parts that overlap with the explanation provided above in Application Example 3 regarding the high-efficiency DC/DC power converter using an unregulated bus converter according to an embodiment of the invention will be omitted or abbreviated.

FIGS. 6(*a*) and 6(*b*) are circuit diagrams of the high-efficiency bidirectional DC/DC power converter using an unregulated bus converter according to a preferred embodiment of the present invention.

According to Application Example 4, the high-efficiency DC/DC power converter using an unregulated bus converter according to an embodiment of the present invention, when operated in the forward direction, as illustrated in FIG. 6(*a*), comprises a boost converter 100 and an LLC resonant converter 200. Also, it further comprises: an output voltage detector circuit 300, configured to detect the output voltage of the LLC resonant converter 200; a bidirectional converter control unit 110, configured to control the boost converter 100 by means of the output voltage detector circuit 300; and a constant duty ratio gate pulse generating circuit 210, configured to control the LLC resonant converter 200.

The boost converter 100, in the same manner as the high-efficiency DC/DC power converter using an unregulated bus converter according to an embodiment of the present invention according to Application Example 3, steps up a wide-ranging input, maintaining it at a consistent level, and regulates the output voltage. Also, the boost converter 100 according to the present application example further comprises: a boost inductor ($L_b$) and a boost rectifier switch ($S_{b1}$) in series connection with the input power source; and a boost switch ($S_{b2}$) and a boost capacitor ($C_{b1}$) in parallel connection with the input power source.

The LLC resonant converter 200 is for stepping up the output of the boost converter 100, and comprises: first resonant switches ($S_{p1}$, $S_{p4}$) and second resonant switches ($S_{p2}$, $S_{p3}$); a resonant capacitor ($C_r$), a resonant inductor ($L_r$) and a primary coil in parallel connection with the second resonant switches ($S_{p2}$, $S_{p3}$); two secondary coils in the opposite direction to the primary coil; first and second rectifier switches ($S_1$, $S_2$), respectively joined to the two secondary coils and configured to operate the two secondary coils differently from each other; and a capacitor (C) joined to the output unit.

A brief overview will now be provided on the high-efficiency DC/DC power converter using an unregulated bus converter according to an embodiment of the present invention having the structure described above according to Application Example 4. First, when the boost switch ($S_{b2}$) of the boost converter 100 is turned on, a circulating electric current will flow through the boost switch. At this time, the flow of the electric current is somewhat delayed by the boost inductor ($L_b$).

At this time, as the boost rectifier switch ($S_{b1}$) is off and the internal diode of the switch ($S_{b1}$) has the output voltage in the reverse direction, it cannot pass the electric current. In other words, while the boost rectifier switch ($S_{b1}$) is off, there is a bias in the reverse direction with the output potential greater than the input side, and no electric current flows through the internal diode of the boost rectifier switch ($S_{b1}$).

Afterward, if the boost switch is turned off, the boost inductor ($L_b$) tries to allow the flowing electric current to continue to flow. In other words, even if the boost switch ($S_{b2}$) is turned off, the electric current in the boost inductor ($L_b$) is not immediately cut off, but rather, gradually decreases by a time constant. Also, due to the boost rectifier switch ($S_{b1}$) being turned on at the same time as the boost switch ($S_{b2}$) being off, the electric current in the boost inductor ($L_b$), unable to flow to the boost switch ($S_{b2}$), will flow through the boost rectifier switch ($S_{b1}$). Also, such an electric current of the boost inductor ($L_b$) charges the boost capacitor ($C_{b1}$). In other words, when the boost switch ($S_{b2}$) is turned off, the boost inductor ($L_b$), like a current source, will cause an electric current to flow by means of the internally existing magnetic field, and at this time, if the boost switch ($S_{b2}$) is turned on again, the electric current applied to the boost converter 100 and the electric current remaining in the boost inductor ($L_b$) are added together, with a greater electric current being applied to the boost capacitor ($C_{b1}$). Accordingly, the output voltage increases, a step-up is achieved, and the electric current decreases. Also, the output of the boost converter 100 is applied to the LLC resonant converter 200 as input.

When the output of the boost converter 100 is applied to the LLC resonant converter 200 as input and a high signal is applied to the constant duty ratio gate pulse generating circuit 210, the second resonant switches ($S_{p2}$, $S_{p3}$) are turned off, and the first resonant switches ($S_{p1}$, $S_{p4}$) are turned on. Also, accordingly, the resonant capacitor ($C_r$) is charged, and after the resonant capacitor ($C_r$) is charged, an electric current will flow to the resonant inductor ($L_r$). Afterward, the electric current flowing to the resonant inductor ($L_r$) is applied to the primary coil ($L_p$) and a magnetic field is formed. Due to the magnetic field formed around the primary coil ($L_p$), a magnetic field is induced around the secondary coils, and the electric current induced around the secondary coils are output to the output unit by the first rectifier switch ($S_1$). Also, the electric current caused to flow by the first rectifier switch ($S_1$) is also charged at the capacitor (C).

Also, after the dead-time of the first resonant switches ($S_{p1}$, $S_{p4}$) being turned off, when the output of the boost converter 100 is input into the LLC resonant converter 200 and a low signal is input into the constant duty ratio gate pulse generating circuit 210, the second resonant switches ($S_{p2}$, $S_{p3}$) are turned on. Also, accordingly, the resonant current flows through the second resonant switches ($S_{p2}$, $S_{p3}$) in the reverse direction, and the resonant capacitor ($C_r$), after discharged, is reverse charged; at this time the electric current is transferred to the secondary side of the LLC resonant converter 200. Here, on the secondary side of the LLC resonant converter 200, the second rectifier switch ($S_2$), operated by the same signals as the second resonant switches ($S_{p2}$, $S_{p3}$), is turned on, and the magnetized inductance current appears to decrease linearly with the output voltage.

Afterward, in the interval when the second resonant switches ($S_{p2}$, $S_{p3}$) are turned off, the electric current flowing through the second resonant switches ($S_{p2}$, $S_{p3}$) will flow through the internal diode of the first resonant switches ($S_{p1}$, $S_{p4}$). At this time, the magnetized electric current no longer increases, and no energy is transferred to the secondary side of the LLC resonant converter 200.

A more detailed explanation will now be provided on the reverse operation of the high-efficiency DC/DC power converter using an unregulated bus converter according to an embodiment of the present invention, according to Application Example 4.

To explain the reverse operation of the LLC resonant converter with reference to FIG. 6(*b*), when the LLC resonant converter is input, and the first rectifier switch ($S_1$) and the first resonant switches ($S_{p1}$, $S_{p4}$) are turned on, the input side electric current is applied to the transformer's primary coil and a magnetic field is formed. In other words, due to the magnetic field formed around the primary coil, a magnetic field is induced around the secondary coils, and the electric current induced in the secondary coils, when the first resonant switches ($S_{p1}$, $S_{p4}$) are turned on, charges the resonant capacitor; after the resonant capacitor ($C_r$) is charged, an electric current will flow to the resonant inductor ($L_r$). Here again, the magnetized inductance current increases linearly with the output voltage. This electric current flows through the first resonant switches ($S_{p1}$, $S_{p4}$), and the output voltage of the LLC resonant converter is also charged to the capacitor ($C_{b1}$).

In the interval when the second rectifier switch ($S_2$) and the second resonant switches ($S_{p2}$, $S_{p3}$) are turned on, the electric current on the input side coil flows in the reverse direction, and accordingly, a magnetic field is induced around the secondary coils; the electric current charged at the resonant capacitor ($C_r$), after being discharged, will be charged in the reverse direction. At this time, the magnetized inductance current appears to decrease linearly with the output voltage.

Accordingly, when operated in the reverse direction, the aforementioned first resonant switches ($S_{p1}$, $S_{p4}$) and second resonant switches ($S_{p2}$, $S_{p3}$) perform the rectification function for direct current output.

To explain the operational principle of the buck converter, the output of the aforementioned LLC resonant converter becomes the input of the buck converter. When the buck converter switch ($S_{b1}$) is turned on, an electric current will flow through the buck converter inductor ($L_b$). At this time, the buck converter rectifier switch ($S_{b2}$) is off and cannot pass the electric current. Afterward, even if the buck converter switch ($S_{b1}$) is turned off, the buck inductor tries to allow the flowing electric current to continue to flow. In other words, even if the buck converter switch ($S_{b1}$) is turned off, the electric current of the buck converter is not immediately turned off, but rather, gradually decreases by a time constant. Also, when the buck converter switch ($S_{b1}$) is off, the buck converter rectifier switch ($S_{b2}$) is turned on, forming a passage for the inductor current of the buck converter and allowing the electric current to flow continuously. Also, such an electric current of the buck converter inductor ($L_b$) charges the capacitor ($C_{b2}$) on the output side of the buck converter. In other words, when the buck converter switch ($S_{b1}$) is turned off, the buck inductor ($L_b$), like a current source, causes an electric current to flow by means of the internally existing magnetic field, and at this time, a volt.sec equilibrium condition applies, stepping down the voltage as output.

Figure 7A:
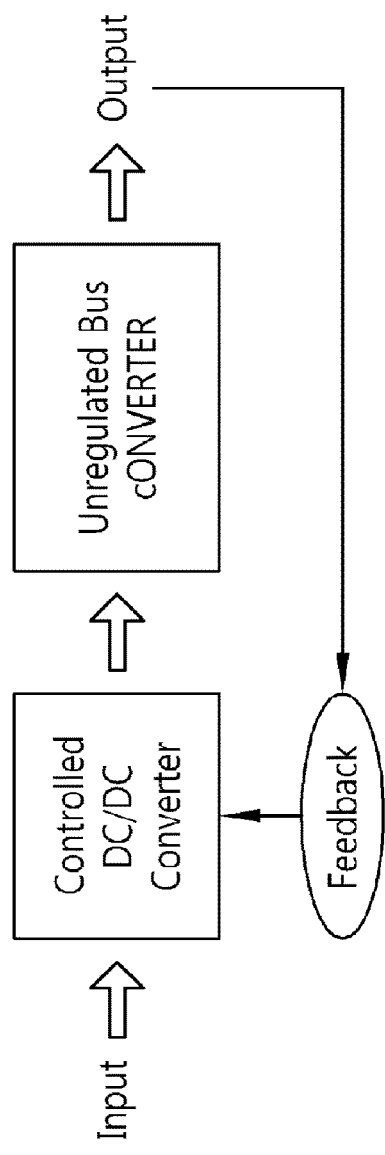
FIGS. 7(a) and 7(b) are block diagrams showing that a high-efficiency DC/DC power converter using an unregulated bus converter according to an embodiment of the invention can be located in the front or back of a bus converter that is not regulated by a controlled DC/DC converter.
Figure 7B:
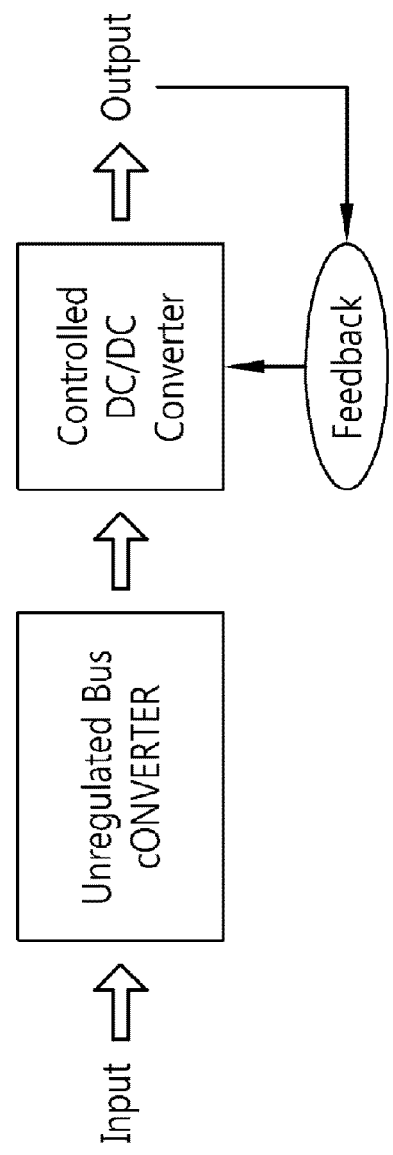

In addition, FIGS. 7(a) and 7(b) are block diagrams showing that a high-efficiency DC/DC power converter using an unregulated bus converter according to an embodiment of the invention can be located in the front or back of a bus converter that is not regulated by a controlled DC/DC converter.

In other words, as regards the high-efficiency DC/DC power converter using an unregulated bus converter according to an embodiment of the present invention, as illustrated in FIG. 7(a), a controlled DC/DC converter may be located in front of an unregulated bus converter. In this case, the output of the controlled DC/DC converter is applied to the unregulated bus converter as input, and the external output from the unregulated bus converter is fed back into the DC/DC converter. Also, accordingly, the output of the DC/DC converter may be controlled when input into the bus converter. However, the present invention is not limited to this, and as illustrated in FIG. 7(b), the controlled DC/DC converter may be located to the back of the unregulated bus converter. In this case, the output of the unregulated bus converter is applied to the controlled DC/DC converter as input, and the external output from the DC/DC converter is fed back into the DC/DC converter.

Figure 8:
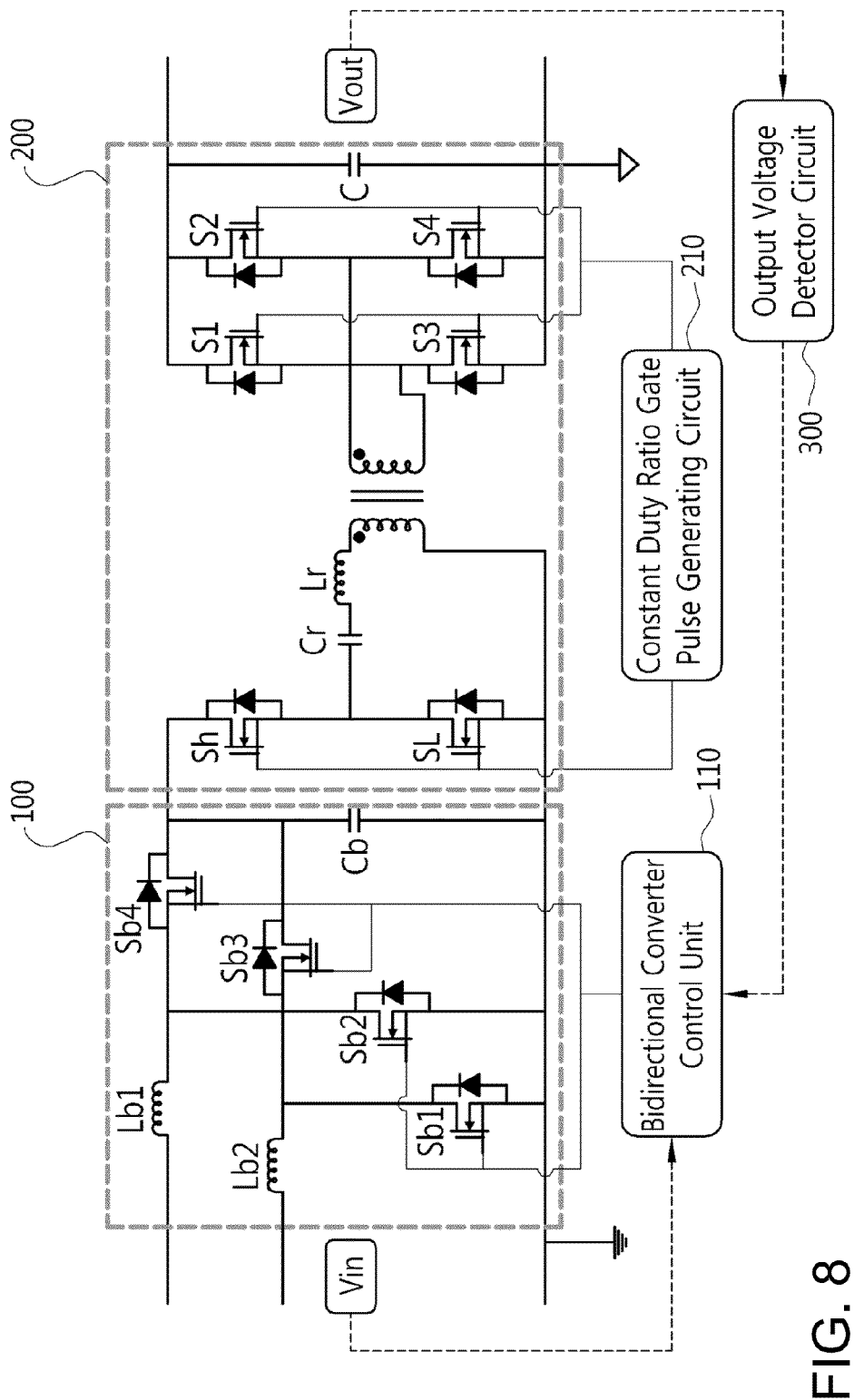
FIG. 8 and FIG. 9 are circuit diagrams in which the circuits in FIGS. 3(a), 3(b), 4(a), and 4(b) are made to suit the a high capacity by interleaving two controlled DC/DC converters in parallel.
Figure 9:
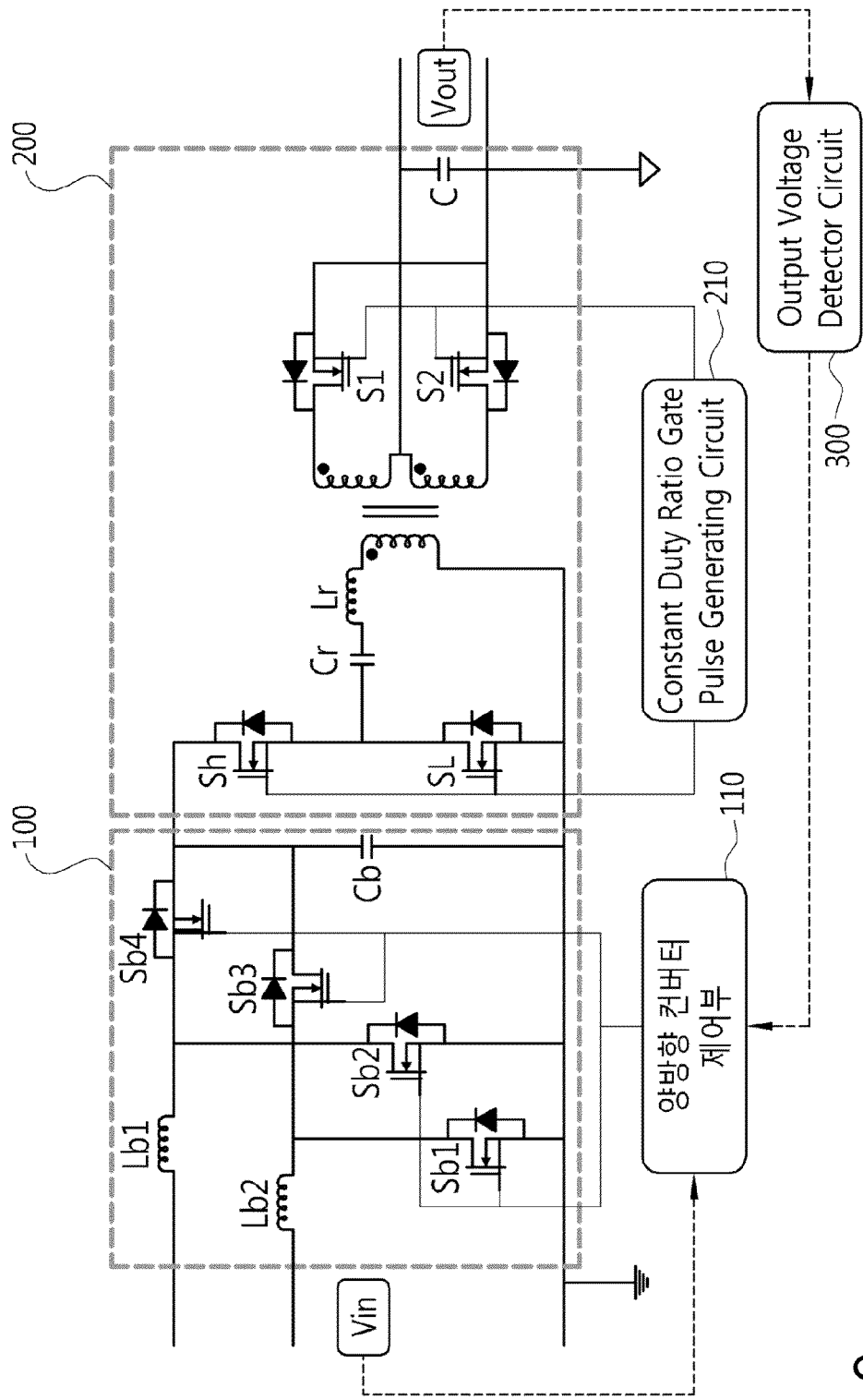

FIGS. 8 and 9 are circuit diagrams in which the circuits in FIGS. 3 and 4 are made to suit the bulk through parallel interleaving of two controlled DC/DC converters.

In order to confirm the usefulness of the converter in FIG. 8, a system was configured and an experiment was conducted. Table 1 shows the parameters of the experiment on the converter in FIG. 8, and FIGS. 10 to 13 are waveforms from the results of the experiment

TABLE 1

|  | Value | Unit |
| --- | --- | --- |
| Input voltage | 140 | V |
| Output voltage | 400 | V |
| Output current | 0-6 | A |
| Switching frequency (boost/LLC) | 50/125 | kHz |

Figure 10:
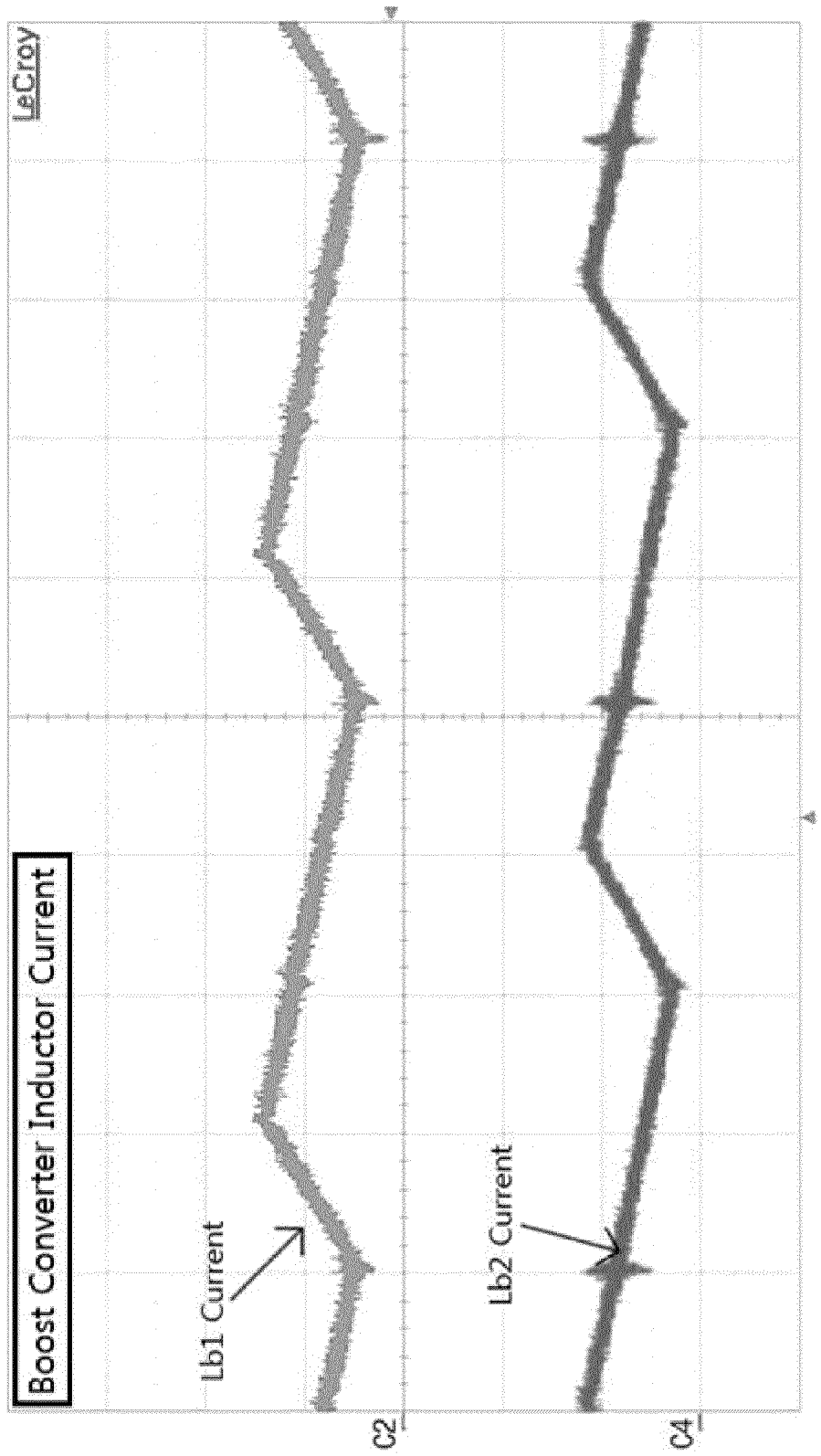
FIG. 10 is the waveform of the inductor current of the boost converter during forward operation.

FIG. 10 shows the waveform of the inductor current of the boost converter during forward operation. From this the electric current waveform of the interleaved boost converter can be seen.

Figure 11:
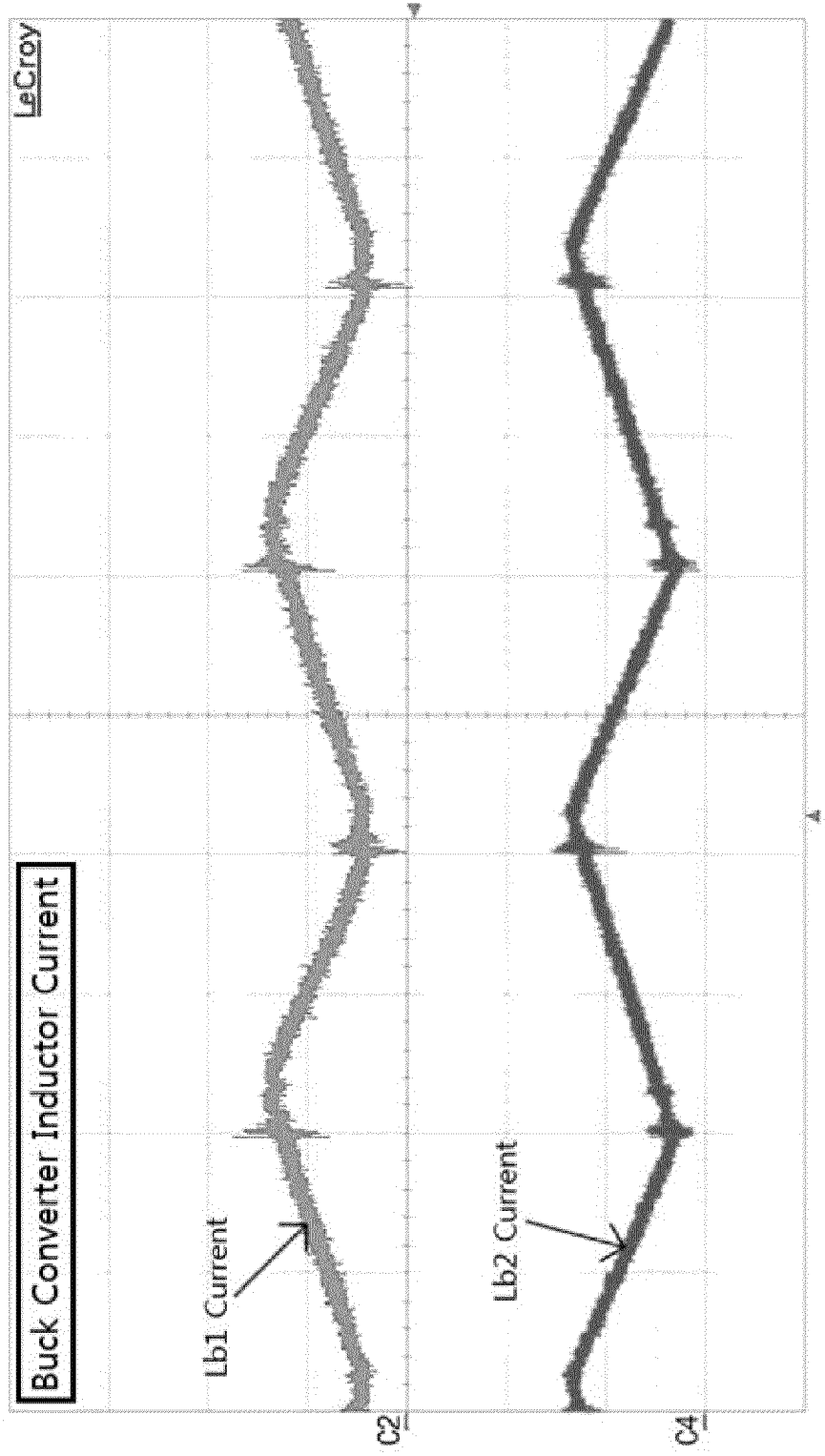
FIG. 11 is the waveform of the inductor current of the buck converter during reverse operation.

FIG. 11 shows the waveform of the inductor current of the buck converter during reverse operation.

Figure 12:
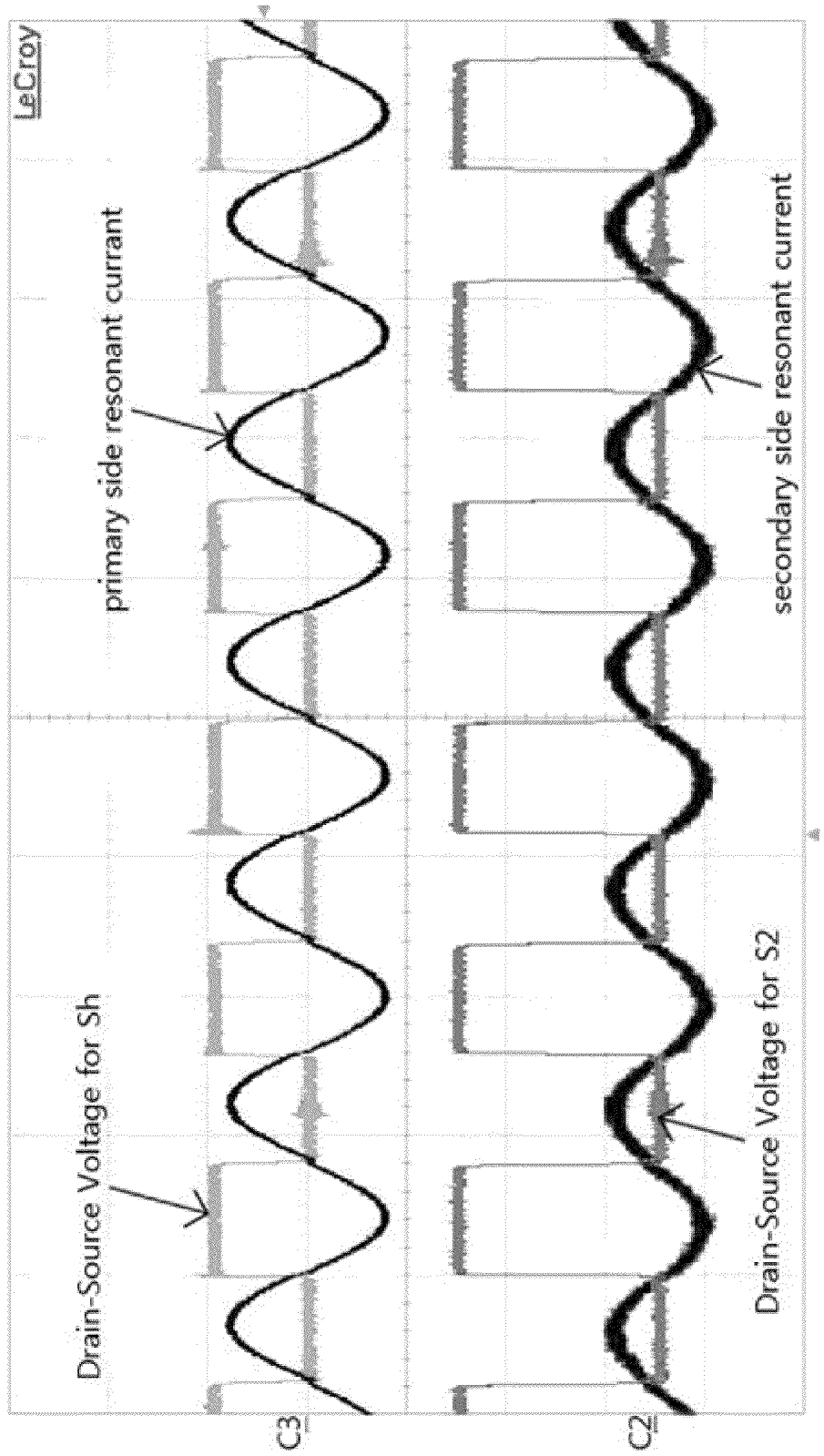
FIG. 12 is a graph of the drain-source voltages at both ends of the switch and the resonant currents of the half-bridge LLC resonant converter circuit of a two-stage insulated bidirectional DC/DC power converter according to an embodiment of the present invention, during forward operation.

FIG. 12 shows the drain-source voltage at both ends of the switch and the resonance currents of the half-bridge LLC resonant converter circuit of a two-stage insulated bidirectional DC/DC power converter according to an embodiment of the present invention, during forward operation. Here, the resonance waveform shows the form of a sine wave, and it can be seen that soft switching is operated by setting the resonance frequency and the switching frequency equally.

Figure 13:
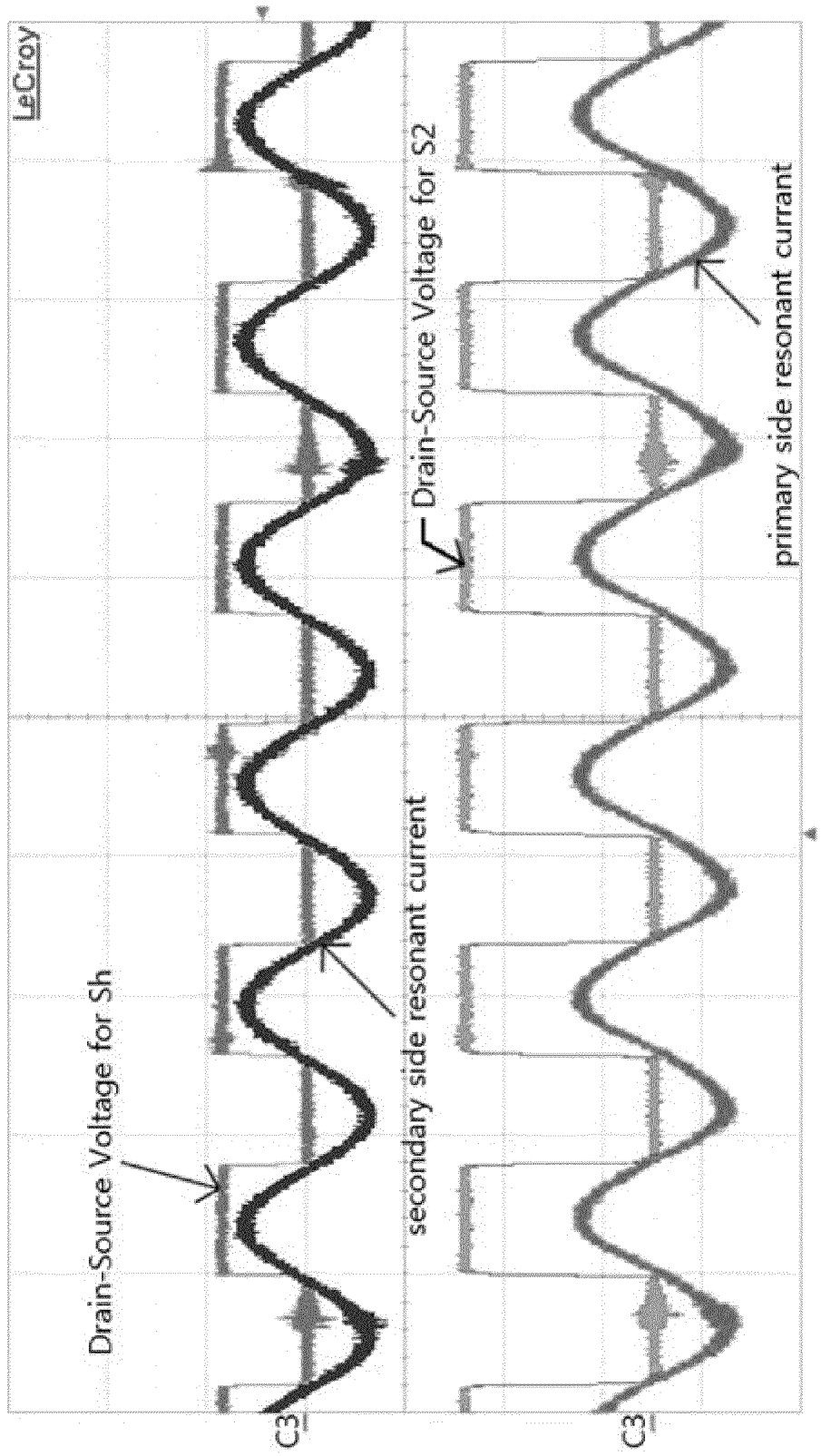
FIG. 13 is a graph of the drain-source voltage at both ends of the switch and the resonant currents of the half-bridge LLC resonant converter circuit of a two-stage insulated bidirectional DC/DC power converter according to an embodiment of the present invention, during reverse operation.

FIG. 13 shows the drain-source voltage at both ends of the switch and the resonance currents of the half-bridge LLC resonant converter circuit of a two-stage insulated bidirectional DC/DC power converter according to an embodiment of the present invention, during reverse operation. It can be seen that soft switching is operated even in reverse drive.

Figure 14:
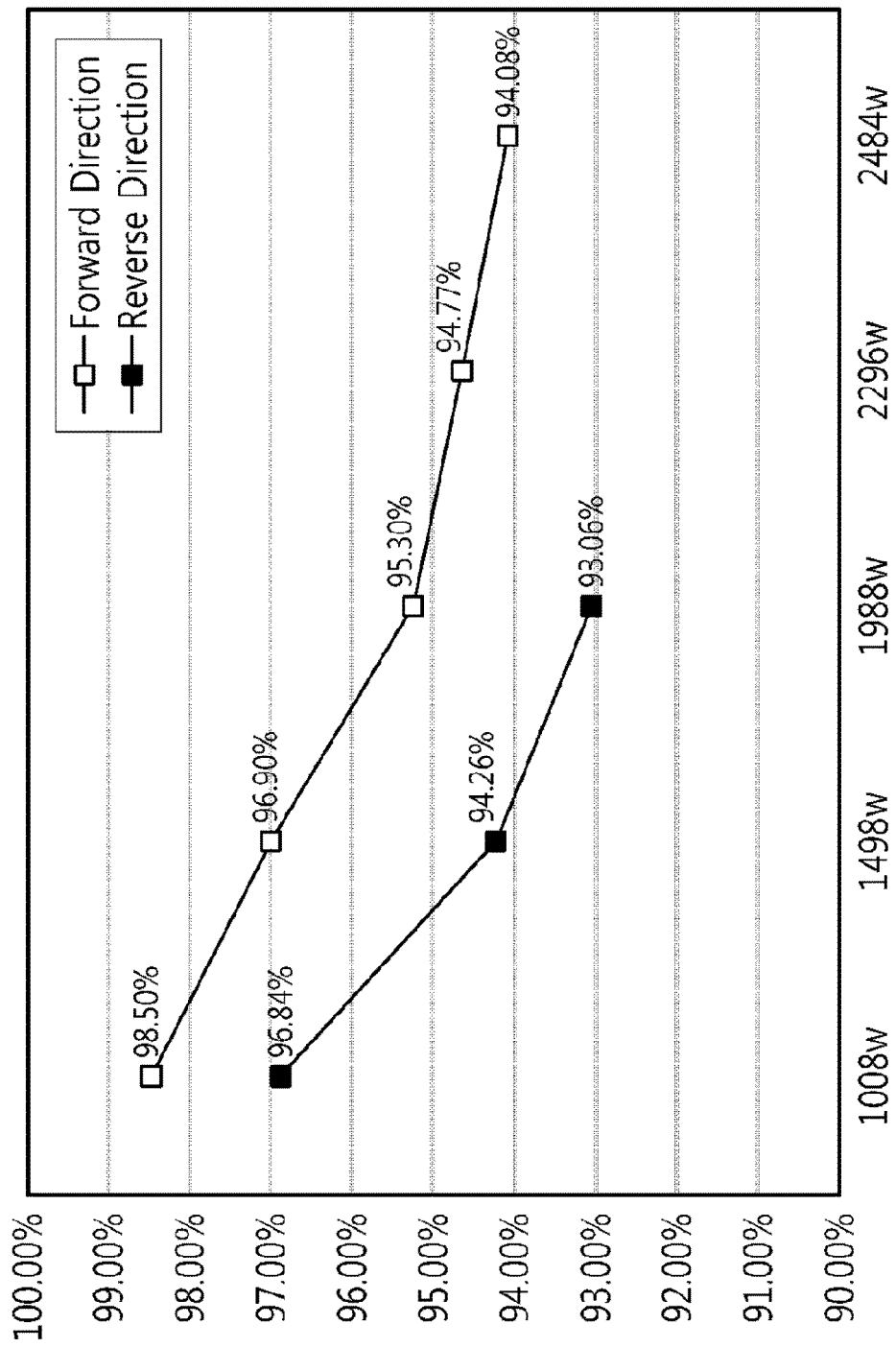
FIG. 14 is a graph measuring the efficiency according to load carrying capacities of the converter in the half-bridge LLC resonant converter circuit of a the two-stage insulated bidirectional DC/DC power converter according to an embodiment of the present invention, during reverse operation.

FIG. 14 is a graph measuring the efficiency according to load carrying capacities of the converter in the half-bridge LLC resonant converter circuit of a two-stage insulated bidirectional DC/DC power converter according to an embodiment of the present invention, during reverse operation. Efficiency was measured for output power ranging from 1000 W to 2500 W. The higher the load increases, the lower the efficiency decreases, with efficiency being measured at 94 percent around 2500 W. For reverse operation, efficiency was measured for output power ranging from 1000 W to 1700 W, with efficiency being measured at 93 percent at 1700 W.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A two-stage bidirectional DC/DC power converter using a constant duty ratio LLC resonant converter, the two-stage bidirectional DC/DC power converter comprising:
    an LLC resonant converter operating at a constant duty ratio;
    a bidirectional converter joined to a front part of the LLC resonant converter, the bidirectional converter configured to perform a boost converter function of converting a first input voltage into a first consistent voltage for input to the LLC resonant converter when the bidirectional converter operates in a forward direction, and to perform a buck converter function of reducing a second input voltage that is output from the LLC resonant converter into a second consistent voltage when the bidirectional converter operates in a reverse direction; and
    a bidirectional converter control unit configured to control changes in the input voltages received by the bidirectional converter and regulate the voltages output from the LLC resonant converter to thereby maintain the first consistent voltages for input to the LLC resonant converter, such that the LLC resonant converter operates at the constant duty ratio.

2. The two-stage insulated bidirectional DC/DC power converter of claim 1, wherein the bidirectional converter control unit receives feedback from the LLC resonant converter to control the booster converter when operating in the forward direction, and receives feedback from the buck converter and controls an external output when operating in the reverse direction.

3. The two-stage insulated bidirectional DC/DC power converter of claim 1, wherein the LLC resonant converter comprises:
    two pairs of the first resonant switches ($S_{p1}$, $S_{p4}$) and the second resonant switches ($S_{p2}$, $S_{p3}$);
    a resonant capacitor, a resonant inductor ($L_r$), and a primary coil connected in parallel with the second resonant switches ($S_{p2}$, $S_{p3}$);
    two secondary coils positioned opposite the primary coil;
    a first and a second rectifier switch ($S_1$, $S_2$) respectively joined to the two secondary coils to operate the two second coils differently from each other; and
    a capacitor (C) joined to an output end.

4. The two-stage insulated bidirectional DC/DC power converter of claim 1, further comprising:
an output voltage detector circuit configured to detect an output voltage of the LLC resonant converter and feed it back to the bidirectional converter control unit when operating in the forward direction, or detect an output voltage of the bidirectional converter and feed it back to the bidirectional converter control unit when operating in the reverse direction;
wherein the bidirectional converter control unit adjusts an output voltage of the bidirectional converter according to an output voltage of the LLC resonant converter when operating in the forward direction or of the aforementioned bidirectional converter when operating in a reverse direction, as fed back from the output voltage detector circuit.

5. The two-stage insulated bidirectional DC/DC power converter of claim 4, further comprising:
a constant duty ratio gate pulse generating circuit configured to control an on/off state of the LLC resonant converter.

6. The two-stage insulated bidirectional DC/DC power converter of claim 4, wherein the bidirectional converter is additionally connected in parallel with a second DC/DC power converter according to converter capacity.

7. The two-stage insulated bidirectional DC/DC power converter of claim 4, wherein a method for controlling an on/off state of the LLC resonant converter is a half-bridge or a full-bridge method, and wherein a transformer secondary comprises a full-bridge or a push-pull rectifier circuit.

8. The two-stage insulated bidirectional DC/DC power converter of claim 1, further comprising:
a constant duty ratio gate pulse generating circuit configured to control an on/off state of the LLC resonant converter.

9. The two-stage insulated bidirectional DC/DC power converter of claim 8, wherein the bidirectional converter control unit and the constant duty ratio gate pulse generating circuit include a pulse width modulation controller.

10. The two-stage insulated bidirectional DC/DC power converter of claim 8, wherein the bidirectional converter control unit and the constant duty ratio gate pulse generating circuit include a pulse width modulation controller.

11. The two-stage insulated bidirectional DC/DC power converter of claim 1, wherein the bidirectional converter is additionally connected in parallel with a second DC/DC power converter according to converter capacity.

12. The two-stage insulated bidirectional DC/DC power converter of claim 1, wherein a method for controlling an on/off state of the LLC resonant converter is a half-bridge or a full-bridge method, and wherein a transformer secondary comprises a full-bridge or a push-pull rectifier circuit.

13. The two-stage insulated bidirectional DC/DC power converter of claim 12, wherein the full-bridge or push-pull rectifier circuit comprises:
a switch configured to be switched by a constant duty ratio gate pulse generating circuit.

14. The two-stage insulated bidirectional DC/DC power converter of claim 12, wherein the full-bridge or push-pull rectifier circuit comprises:
a switch configured to be switched by a constant duty ratio gate pulse generating circuit.

15. The two-stage insulated bidirectional DC/DC power converter of claim 1, wherein the LLC resonant converter comprises:
a first and a second resonant switch ($S_h$, $S_L$) connected in series;
a resonant capacitor connected in parallel with the second resonant switch;
a resonant inductor and a primary coil connected in series with the resonant capacitor;
a secondary coil positioned opposite the primary coil;
a first to fourth rectifier switch joined with the secondary coil; and
a capacitor connected in parallel with a first to fourth rectifier switch joined to the secondary coil and with the second and fourth rectifier switches.

16. The two-stage insulated bidirectional DC/DC power converter of claim 1, wherein the LLC resonant converter comprises:
two pairs of the first resonant switches ($S_{p1}$, $S_{p4}$) and the second resonant switches ($S_{p2}$, $S_{p3}$);
a resonant capacitor, a resonant inductor, and a primary coil connected in parallel with the second resonant switches ($S_{p2}$, $S_{p3}$);
a secondary coil positioned opposite the primary coil; and
a capacitor connected in parallel with two pairs of the first rectifier switches ($S_1$, $S_4$) and the second rectifier switches ($S_2$, $S_3$) to perform a smoothing function, the first rectifier switches and the second rectifier switches joined to the secondary coil.

17. The two-stage insulated bidirectional DC/DC power converter of claim 1, wherein the LLC resonant converter comprises:
a first and a second resonant switch connected in series;
a resonant capacitor connected in parallel with the second resonant switch;
a resonant inductor and a primary coil connected in series with the resonant capacitor;
a plurality of secondary coils positioned opposite the primary coil; and
a first and a second switch respectively joined to the plurality of secondary coils to operate the plurality of secondary coils differently from each other; and a capacitor joined to an output end.

* * * * *